United States Patent
Ghias et al.

(10) Patent No.: US 11,158,307 B1
(45) Date of Patent: Oct. 26, 2021

(54) ALTERNATE UTTERANCE GENERATION

(71) Applicant: Amazon Technologies, Inc., Seattle, WA (US)

(72) Inventors: Alireza Roshan Ghias, Seattle, WA (US); Sean William Jewell, Seattle, WA (US); Chenlei Guo, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 365 days.

(21) Appl. No.: 16/363,814

(22) Filed: Mar. 25, 2019

(51) Int. Cl.
*G10L 15/04* (2013.01)
*G10L 15/16* (2006.01)
*G06N 3/08* (2006.01)

(52) U.S. Cl.
CPC ............... *G10L 15/16* (2013.01); *G06N 3/08* (2013.01); *G10L 15/04* (2013.01)

(58) Field of Classification Search
CPC ......... G10L 15/04; G10L 15/16; G10L 15/22; G06N 3/08
See application file for complete search history.

(56) References Cited

U.S. PATENT DOCUMENTS

| | | | | |
|---|---|---|---|---|
| 2006/0020463 A1* | 1/2006 | Reich | .................... | G10L 15/187 704/257 |
| 2007/0106508 A1* | 5/2007 | Kahn | .................... | G10L 15/25 704/235 |
| 2008/0208577 A1* | 8/2008 | Jeong | .................... | G10L 15/16 704/231 |
| 2012/0116765 A1* | 5/2012 | Hanazawa | .................... | G10L 15/08 704/251 |
| 2015/0340032 A1* | 11/2015 | Gruenstein | .................... | G06N 3/08 704/232 |
| 2016/0155436 A1* | 6/2016 | Choi | .................... | G10L 15/183 704/232 |
| 2017/0162203 A1* | 6/2017 | Huang | .................... | G10L 15/285 |
| 2017/0221474 A1* | 8/2017 | Hori | .................... | G10L 15/08 |
| 2017/0372696 A1* | 12/2017 | Lee | .................... | G10L 15/16 |
| 2018/0060511 A1* | 3/2018 | Sato | .................... | G16H 50/20 |
| 2018/0096678 A1* | 4/2018 | Zhou | .................... | G10L 15/32 |
| 2018/0174589 A1* | 6/2018 | Choi | .................... | G10L 15/02 |
| 2018/0336880 A1* | 11/2018 | Arik | .................... | G10L 13/08 |
| 2019/0088251 A1* | 3/2019 | Mun | .................... | G10L 15/187 |
| 2019/0236130 A1* | 8/2019 | Li | .................... | G06N 3/0427 |
| 2019/0341025 A1* | 11/2019 | Omote | .................... | G10L 25/30 |
| 2019/0385599 A1* | 12/2019 | Zheng | .................... | G10L 15/08 |
| 2020/0043467 A1* | 2/2020 | Qian | .................... | G10L 21/0308 |
| 2020/0151250 A1* | 5/2020 | Xu | .................... | G06N 3/0445 |
| 2020/0152180 A1* | 5/2020 | Lee | .................... | G06N 3/0454 |
| 2020/0160838 A1* | 5/2020 | Lee | .................... | G10L 15/16 |
| 2020/0234713 A1* | 7/2020 | Gowda | .................... | G10L 15/26 |
| 2020/0312309 A1* | 10/2020 | Lin | .................... | G06N 7/005 |

(Continued)

*Primary Examiner* — Daniel C Washburn
*Assistant Examiner* — Oluwadamilola M Ogunbiyi
(74) *Attorney, Agent, or Firm* — Pierce Atwood LLP

(57) ABSTRACT

A system for handling errors during automatic speech recognition by processing a potentially defective utterance to determine an alternative, potentially successful utterance. The system processes the N-best ASR hypotheses corresponding to the defective utterance using a trained model to generate a word-level feature vector. The word-level feature vector is processed using a sequence-to-sequence architecture to determine the alternate utterance.

20 Claims, 23 Drawing Sheets

(56) References Cited

U.S. PATENT DOCUMENTS

| | | | |
|---|---|---|---|
| 2020/0357387 A1* | 11/2020 | Prabhavalkar | G10L 15/22 |
| 2020/0357392 A1* | 11/2020 | Zhou | G10L 15/16 |
| 2020/0357412 A1* | 11/2020 | Robert Jose | G10L 15/22 |
| 2020/0410985 A1* | 12/2020 | Chen | G10L 15/04 |
| 2021/0035564 A1* | 2/2021 | Ogawa | G10L 15/183 |
| 2021/0074295 A1* | 3/2021 | Moreno | G10L 15/26 |

* cited by examiner

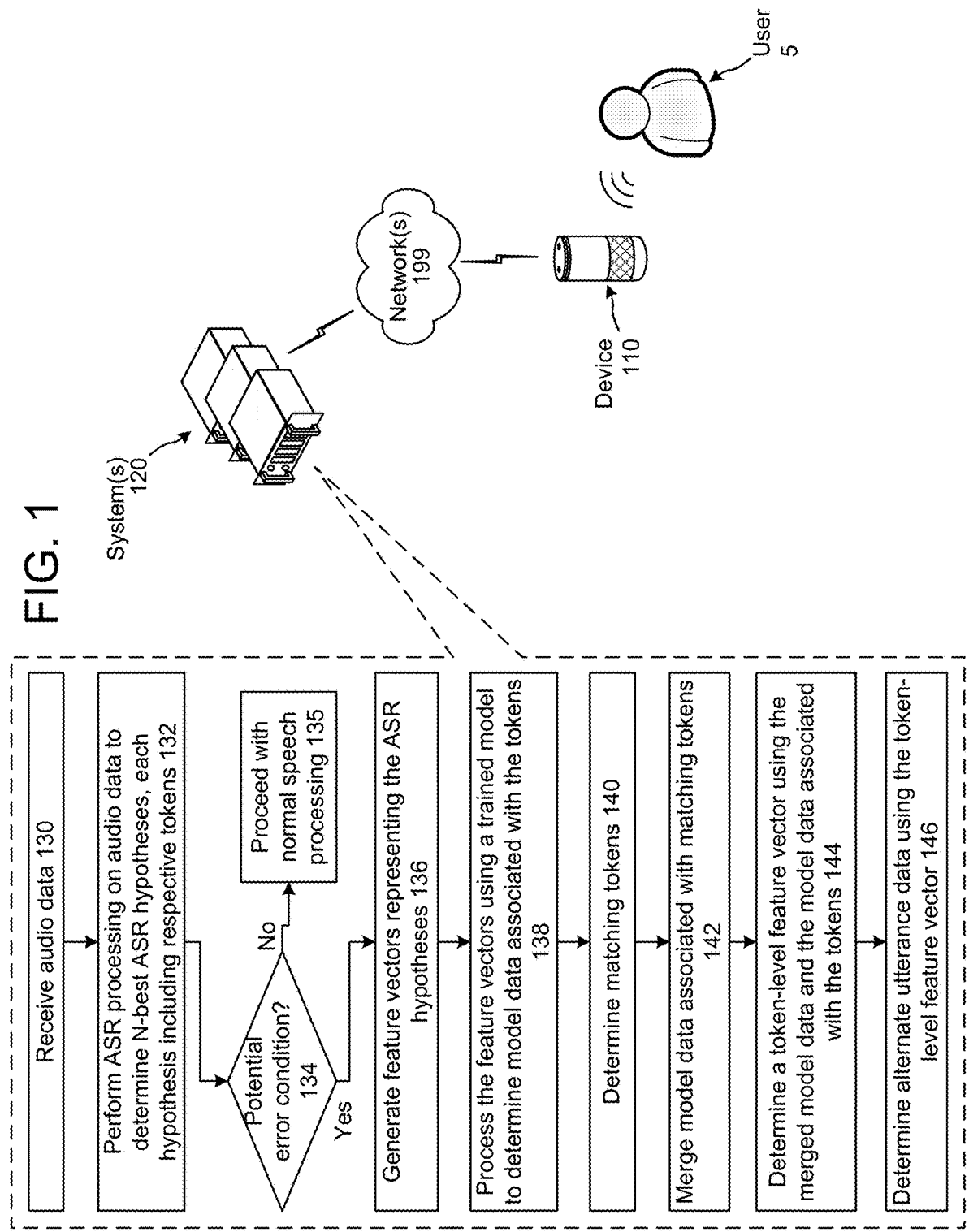

ALTERNATE UTTERANCE GENERATION

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 illustrates a system configured to determine an alternative phrasing of an utterance according to embodiments of the present disclosure.

DETAILED DESCRIPTION

Figure 2A:
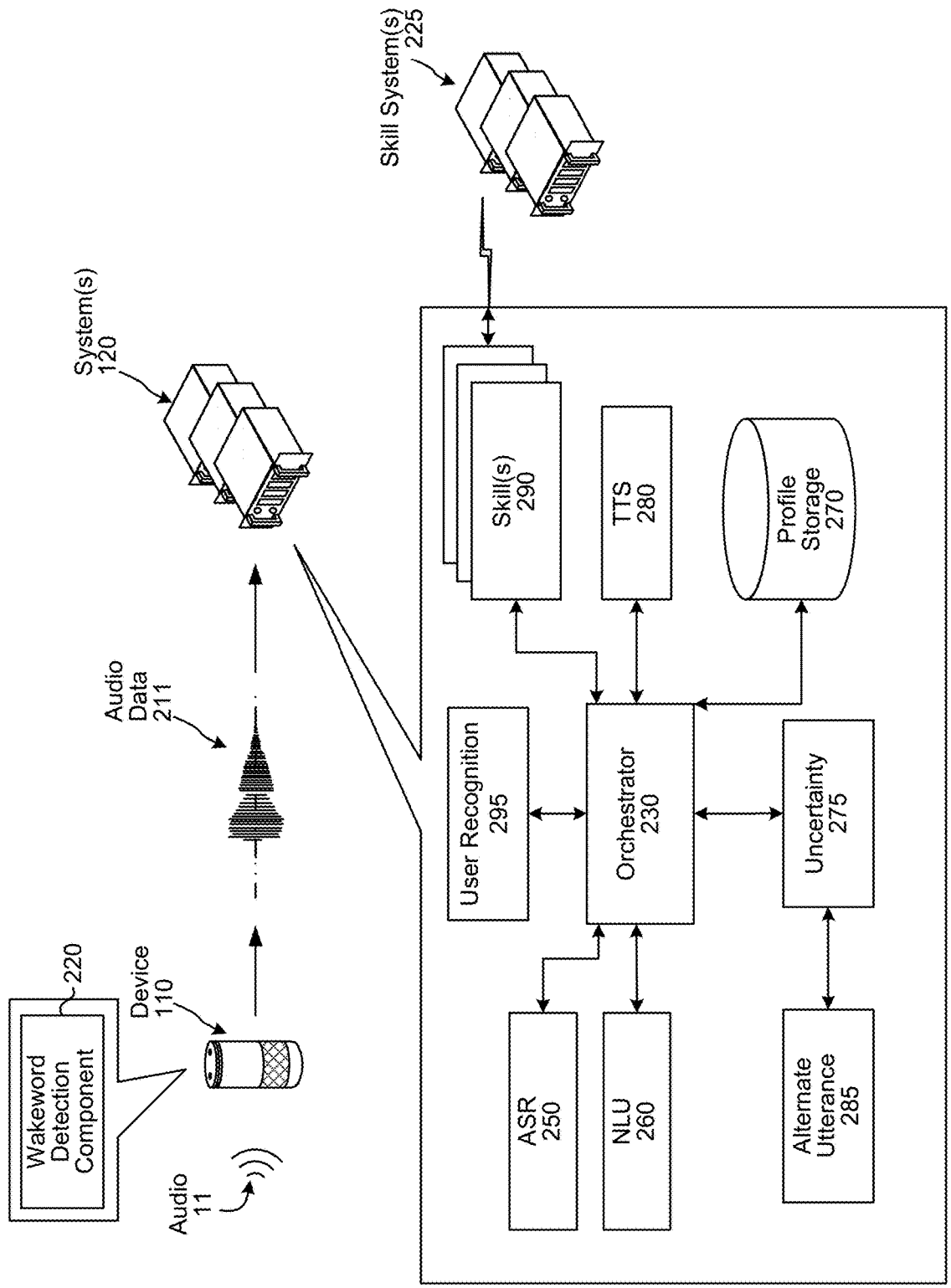
FIG. 2A is a conceptual diagram of components of a system according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play Adele music," a system may output music sung by an artist named Adele. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

One potential failure point for a speech processing system occurs when an error in ASR processing propagates into downstream components such as the NLU, resulting in further errors. For example, a spoken utterance of "open YouTube" may be misrecognized during ASR processing as "open you too," and NLU may be unable to interpret/perform the user's desired action (e.g., resolving to "open U2"). Another potential failure point may be if a user inputs a command phrasing that the system is not configured to recognize. For example, NLU may understand "what's the weather in Seattle", but may not comprehend "is it going to rain in Seattle tomorrow." Users may experience such errors as defects and may need to repeat or rephrase their queries to facilitate system understanding. Such rephrase pairs—e.g., a failed attempt with one phrasing and a subsequent success with a later phrasing having the same intent may be leveraged by the system described herein to train machine learning models to select an alternate utterance/alternate phrasing of an initial utterance before performing NLU processing. Such selection of an alternate utterance may occur when an initial utterance is likely to lead to an error or otherwise may result in an outcome that results in an undesired user experience.

When interacting with the system, a user may experience an improved interaction when the system is able to respond even when the system may encounter certain ASR or NLU processing errors or other misunderstanding/misinterpretation of what the user said. The present disclosure improves ASR by learning from a mapping of defective utterances to successful utterances based on past interactions, and proactively applying the learned mappings during run-time to rewrite an utterance that would have failed or resulted in an error.

The system may capture the uncertainty in ASR by generating multiple likely utterances (e.g., an N-best list of utterance hypotheses) corresponding to the user's audio input. In an improvement for handling ASR errors, a system may be configured to use the multiple interpretations generated by ASR processing to generate an alternate utterance that is used for NLU processing. In exemplary embodiments, the system encodes individual N-best hypotheses using a trained model and combines the hidden states of the individual hypotheses into a token/word based node. An exemplary embodiment employs an encoder-decoder neural network system (as explained below) where the encoder reads in an input utterance token-by-token (e.g., word-by-word) and represents the utterance as a sequence of hidden states. The decoder produces an output utterance token-by-token based on the previous output token(s) and some function of the encoder hidden states. To incorporate information of the input utterance into a vector of fixed length, the system may employ an attention distribution mechanism. The system may also include a copy mechanism to augment the fixed vocabulary of the system with a larger out-of-the-system vocabulary.

The present system may provide a more desirable user experience. This is due, at least in part, to the fact that the present disclosure's teachings decrease a frequency at which unresponsive actions are performed by a system. By decreasing the instances of such actions being performed, user/system interactions may be improved.

FIG. 1 illustrates a system configured to determine an alternate utterance according to embodiments of the present disclosure. Although the figures and discussion herein illustrate certain operational steps of the system in a particular order, the steps described may be performed in a different order (as well as certain steps removed or added) without departing from the intent of the disclosure. As illustrated in FIG. 1, the system may include device 110 local to a user 5, in communication with one or more systems 120 across one or more networks 199.

The system(s) 120 receives (130) audio data. The audio data may include an utterance (input utterance) spoken by the user 5 and captured by the device 110. The system(s) 120 performs (132) automatic speech recognition (ASR) using the audio data to generate language model output data including ASR hypotheses and corresponding scores. ASR may be performed on the audio data as described in detail below. One of the outputs or results of ASR is language model output data. The language model output data may include one or more ASR hypotheses (an N-best list) for the input utterance. Each ASR hypothesis has a score or probability associated with it. For example, the language model output data includes at least a first ASR hypothesis corresponding to a first score and a second ASR hypothesis corresponding to a second score. Each of the ASR hypotheses includes one or more respective tokens representing possible words of the input utterance. For example, the first ASR hypothesis may include at least a first token and the second ASR hypothesis may include at least a second token and a third token.

The system(s) 120 determines (134) that the system may encounter a potential error condition during speech processing of the audio data. For example, the system(s) 120 may determine that the scores corresponding to the ASR hypotheses satisfy a condition (e.g., are below a threshold, above a threshold, or the like) indicating that the ASR processing did not result in at least one confident ASR hypothesis for the input utterance. In other words, there was an error in the ASR processing and the system(s) was unable to select a hypothesis with output text data that actually matches the input utterance. In this case, the system(s) 120 performs the below operations 136-146 to determine an alternate utterance. The system(s) 120 may send the alternate utterance data to the NLU component for processing to avoid errors in NLU processing. If the system(s) 120 determines that there are no potential error conditions, then the system(s) 120 proceeds with the normal speech processing (135) as described in connection with FIG. 2A.

The system(s) 120 generates (136) feature vectors representing the ASR hypotheses. The feature vectors may be word embeddings. A word embedding is a representation of the words in the hypothesis in the form of a multi-dimensional data vector, where each dimension represents some data point regarding the word, its usage, or other information about the word as used in the hypothesis. Details on generating the word embeddings is described below in relation to FIG. 9. The system(s) 120 may generate a first feature vector/first word embedding representing the first ASR hypothesis and a second feature vector/second word embedding representing the second ASR hypothesis.

The system(s) 120 processes (138) the feature vectors using a trained model to determine model data associated with the tokens in the ASR hypotheses. The trained model may be a machine learning model, in particular, a neural network. The model data may be hidden state data of the trained model generated after processing the feature vector. For example, the system(s) 120 may process the first feature vector/first word embedding to determine first model data/first hidden state data associated with the first token of the first ASR hypothesis. The system(s) 120 may process the second feature vector/second word embedding to determine second model data/second hidden state data associated with the second token of the second ASR hypothesis, and also to determine third model data/third hidden state data associated with the third token of the second ASR hypothesis.

In an example embodiment, the trained model may be trained during offline operations. A machine learning model may be trained using training dataset, where the training dataset includes utterance-pairs. Each utterance-pair may include a first defective utterance (one that caused an error in ASR or NLU processing) and a corresponding second successful utterance (one that was a rephrase from the user and resulted in successful NLU processing, or one that was rewritten by the system and resulted in successful NLU). The training dataset may also include the N-best ASR hypotheses (and corresponding scores, feature data, etc.) associated with the first defective utterance. The training dataset may further include the first best ASR hypothesis (and the corresponding score, feature data, etc.) associated with the second successful utterance. The machine learning model may be trained using the training dataset, and the resulting model may be stored as the trained model for use during runtime operations illustrated in FIG. 1. In an example embodiment, the trained model may be a neural network.

The system(s) 120 determines (140) matching tokens. The ASR hypotheses includes multiple tokens representing possible words of the input utterance. Some of the hypotheses may include the same token/word. For example, the first token of the first ASR hypothesis may be the same as the second token of the second ASR hypothesis. The system(s) 120 may determine a serialized list of ASR hypotheses including the unique tokens represented in the ASR hypotheses. For each token, the serialized list also includes origin data indicating which hypothesis the token is included in. For example, the serialized list may include the first token along with first origin data indicating that the first token is from the first ASR hypothesis and the second ASR hypothesis (based on the first token and the second token matching). The serialized list may not include a separate entry for the second token since it is matches the first token that is already included in the list.

The system(s) 120 merges (142) model data associated with the matching tokens. For example, using the serialized list as a guide, the system(s) 120 may determine merged model data/merged hidden state data by merging the model data/hidden state data associated with the first token and the second token based on the first and second tokens matching. In an example embodiment, the system(s) 120 may average the model data/hidden state data associated with the first and second tokens to determine the merged model data/merged hidden state data. In another embodiment, the system(s) 120 may aggregate the model data/hidden state data associated with the first and second tokens to determine the merged model data/merged hidden state data. In yet another embodiment, the system(s) 120 may determine a weighted average of the model data/hidden state data associated with the first and second tokens. For example, the system(s) 120 may multiply the first model data/hidden state data associated with the first token by the first score corresponding to the first ASR hypothesis (that the first token is included in). The second model data/hidden state data associated with the second token is multiplied by the second score corresponding to the second ASR hypothesis (that the second token is included in). The respective weighted model data/hidden state data may then be summed and divided by two to determine the weighted average.

The system(s) 120 determines (144) a token-level feature vector using the merged model data and the model data associated with the other tokens. The token-level feature vector/data vector represents tokens included in the ASR hypotheses. The model data/hidden state data for tokens appearing in multiple hypotheses are merged (in step 142). The merged model data/hidden state data is stored as associated with the first token in the token-level feature vector. The model data/hidden state data for the other tokens (that do not appear in multiple hypotheses) are stored as associated with the respective token in the token-level feature vector. For example, the third model data/third hidden state data associated with the third token of the second ASR hypothesis is stored as associated with the third token. The dimensions of the token-level feature vector depends on the number of unique tokens included in the ASR hypotheses.

The system(s) 120 determines (146) alternate utterance data using at least the token-level feature vector. The system(s) 120 may process the token-level feature vector using a sequence-to-sequence architecture, described in further detail with relation to FIGS. 10 and 11. The system(s) 120 processes the token-level feature vector to predict/determine output tokens for the alternate utterance, where the output tokens are determined one-by-one in sequence. The system(s) 120 may retrieve a vocabulary of words, determine context data using the token-level feature vector, and probability data corresponding to a first output token of the alternate utterance. The probability data may indicate whether the first output token should be generated/selected from the vocabulary or it should be copied from the tokens represented in the token-level feature vector. After the first output token is determined, the context data is updated for the next time-step based on the token-level feature vector and the first output token. Probability data corresponding to a second output token is determined based on the context data, where the probability data indicates whether the second output token should be generated/selected from the vocabulary or it should be copied from the tokens represented in the token-level feature vector. The alternate utterance is determined using the output tokens generated by the system(s) 120, including the first output token and the second output token.

In this manner, the system(s) 120 processes multiple ASR hypotheses to determine a token-level feature vector. The token-level feature vector is processed, using context data and vocabulary data, to determine the tokens of the alternate utterance in sequence one-by-one.

The system may operate using various components as illustrated in FIG. 2A. The various components may be located on the same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120. The audio data 211 may include data corresponding to the wakeword, or the portion of the audio corresponding to the wakeword may be removed by the device 110 prior to sending the audio data 211 to the system(s) 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the input audio data 211 to a speech processing component 240. An ASR component 250 of the speech processing component 240 transcribes the input audio data 211 into input text data representing one more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The NLU component 260 receives the ASR hypothesis/hypotheses (i.e., text data) attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The system(s) 120 may also include an uncertainty component 275. The uncertainty component 275 may detect when the system(s) 120 may encounter a potential error in speech processing or natural language understanding. The uncertainty component 275 may determine when the ASR component 250 is unable to generate text data corresponding to the utterance represented in the audio data 211 with a certain level of confidence. Details of how the ASR component 250 generates text data are described below in connection with FIG. 2B. The uncertainty component 275 may also determine when the NLU component 260 is unable to generate an intent corresponding to the utterance with a certain level of confidence. Details of how the NLU component 260 generates intent data are described above.

In particular, the ASR component 250 outputs an N-best list of ASR hypotheses. The N-best list includes a ranked listing of hypotheses of what the utterance may be. The ASR component 250 may assign a score to each hypothesis, where the score may indicate a confidence level. The ASR component 250 selects the hypothesis with the highest score (that may be above a threshold) as the output text data corresponding to the utterance. In some cases, none of the scores of the N-best ASR hypotheses may be above a threshold. In other words, the ASR component 250 may be unable to confidently select a hypothesis for the text data corresponding to the utterance. This may be because of the quality of the audio data (for example, due to a noisy environment), traits of the speaker (such as accent), use of uncommon words or proper nouns, and the like. The NLU component 260 outputs an N-best list of NLU hypotheses, which includes a ranked listing of hypotheses of what the intent of utterance may be. The NLU component 260 may assign a confidence score to each hypothesis, and may select the hypothesis with the highest score (that may be above a threshold) as the intent corresponding to the utterance. In some cases, none of the N-best NLU hypothesis have scores above a threshold. In other words, the NLU component 260 may be unable to confidently select a hypothesis for the intent corresponding to the utterance.

In such cases where the ASR component 250 and the NLU component 260 are unable to generate an output, the uncertainty component 275 may determine to execute or invoke an alternate utterance component 285, rather than causing friction in the user experience. In an example embodiment, the uncertainty component 275 may analyze the N-best list and the respective scores to determine that the ASR component 250 is likely to output an error, and may determine to invoke the alternate utterance component 285. In another embodiment, the uncertainty component 275 may determine to invoke the alternate utterance component 285 based on how long it is taking the ASR component 250 and/or the NLU component 260 to process the utterance and output data.

The system(s) 120 may also include the alternate utterance component 285. The alternate utterance component 285 may analyze the ASR N-best list hypotheses using an encoder-decoder system, and may generate an alternate utterance for an input utterance. Details of the alternate utterance component 285 are described below in connection with FIGS. 10, 12 and 13.

Figure 2B:
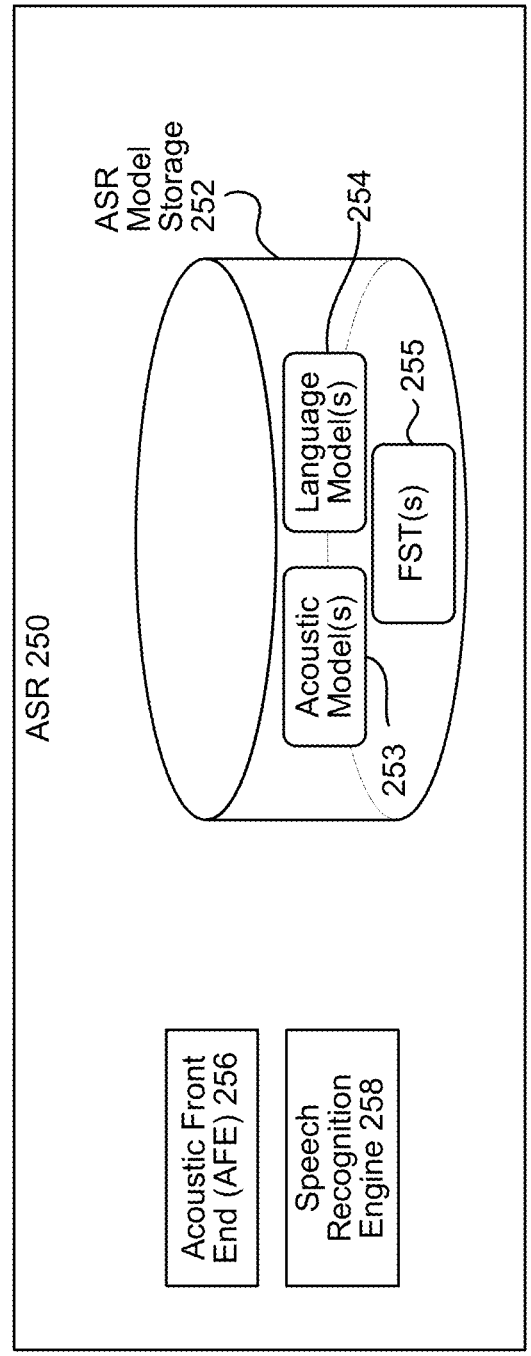
FIG. 2B is a conceptual diagram of automatic speech recognition components according to embodiments of the present disclosure.

FIG. 2B as illustrated shows specific components of the ASR component 250. As noted above, the ASR component 250 transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252. For example, the ASR process may compare the input audio data with models for sounds (e.g., subword units or phonemes) and sequences of sounds to identify words that match the sequence of sounds spoken in the utterance of the audio data. Alternatively, the ASR process may use a finite state transducer (FST) 255 to implement the language model functions, as explained below.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR model storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and an ASR engine 258. The acoustic front end (AFE) 256 transforms the audio data from the microphone into data for processing by the n. The ASR engine 258 compares the speech recognition data with acoustic models 253, language models 254, FST 255, and/or other data models and information for recognizing the speech conveyed in the audio data. The AFE 256 may reduce noise in the audio data and divide the digitized audio data into frames representing time intervals for which the AFE determines a number of values, called features, representing the qualities of the audio data, along with a set of those values, called a feature vector, representing the features/qualities of the audio data within the frame. Typically audio frames may be 10 ms each. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The ASR engine 258 may process the output from the AFE 256 with reference to information stored in ASR model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the ASR engine 258.

The ASR engine 258 attempts to match received feature vectors to language phonemes and words as known in the stored acoustic models 253, language models 254, and FST 255. The ASR engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The ASR engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using finite state transducers (FSTs) explained below, may also be used.

As part of the ASR processing the ASR engine 258 may use acoustic model(s) 253 to attempt to match received audio feature vectors to words or subword units. A subword unit may be a senon, phoneme, phoneme in context, syllable, part of a syllable, syllable in context, or any other such portion of a word. The ASR engine 258 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR module outputs speech results that make sense grammatically.

The ASR engine 258 may use a number of techniques to match feature vectors to phonemes or other phonetic units, such as biphones, triphones, etc. One common technique is using Hidden Markov Models (HMMs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the MINI and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the ASR engine 258, the state may change or stay the same, based on the processing of the new feature vectors. A Viterbi algorithm may be used to find the most likely sequence of states based on the processed feature vectors.

In one example, the ASR engine 258 may receive a series of feature vectors for sound corresponding to a user saying "There is a bat in my car." The ASR engine 258 may attempt to match each feature vector with a phoneme. As new feature vectors are processed, the ASR engine 258 may determine state transitions (for example, using HMMs) to determine whether a probability of whether a state should either remain the same, or change to a new state, i.e., whether an incoming feature vector results in a state transition from one phone to another. As the processing continues, the ASR engine 258 continues calculating such state transition probabilities. After processing one feature vector, the speech recognition may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the ASR engine 258 may also calculate potential states for other phonemes. In this manner multiple states and state transition probabilities may be calculated.

The probable states and probable state transitions calculated by the ASR engine 258 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The ASR engine 258 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken utterance. The language modeling may be determined from a text corpus and may be customized for particular applications.

Figure 3:
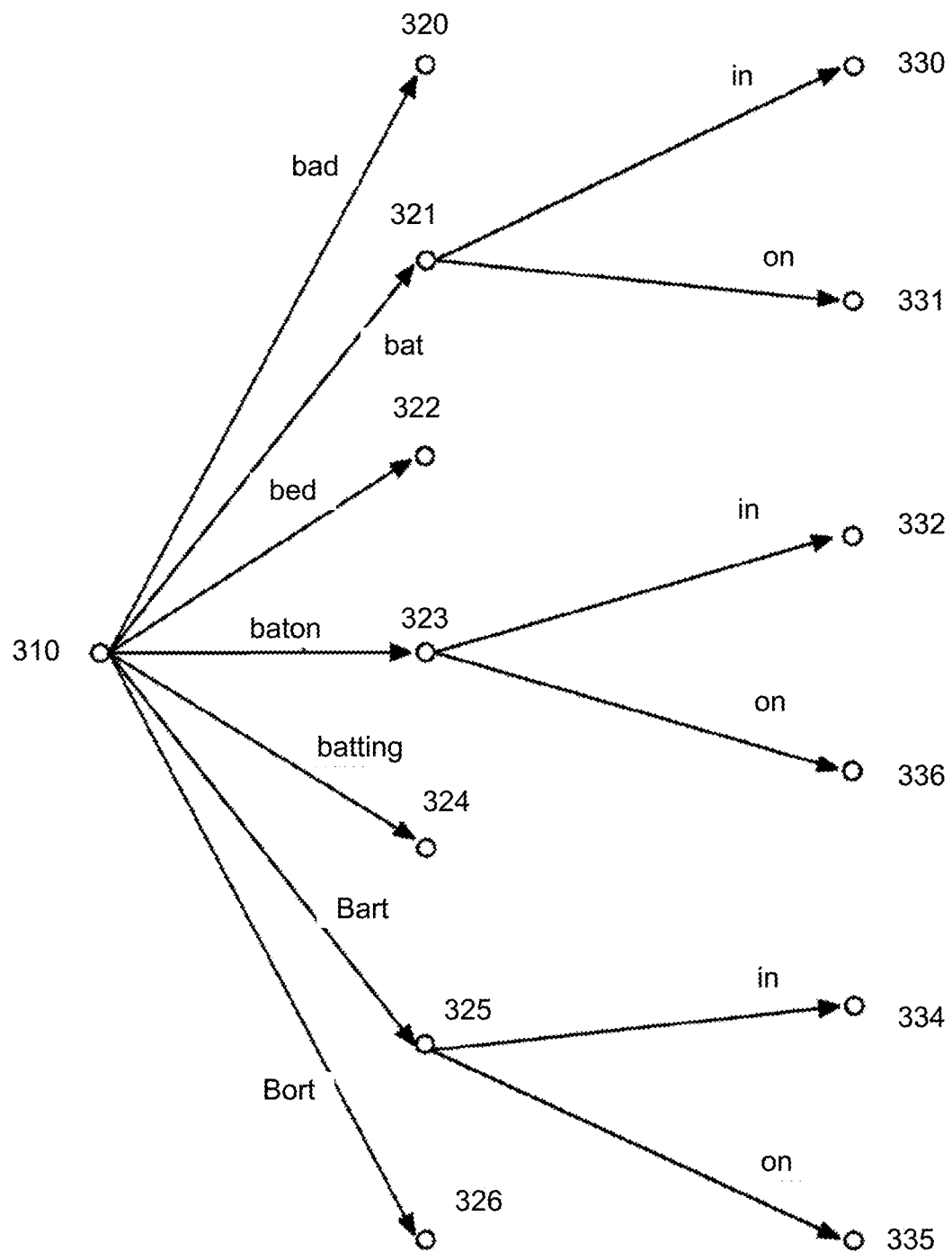
FIG. 3 illustrates a word result network according to embodiments of the present disclosure.

As the ASR engine 258 determines potential words from the input audio the lattice may become very large as many potential sounds and words are considered as potential matches for the input audio. The potential matches may be illustrated as a word result network representing possible sequences of words that may be recognized and the likelihood of each sequence. FIG. 3 shows an example of a word result network that may be used by ASR engine 258 for recognizing speech according to some aspects of the present disclosure. A word result network may consist of sequences of words that may be recognized and the likelihood of each sequence. The likelihood of any path in the word result network may be determined by an acoustic model and a language model. In FIG. 3, the paths shown include, for example, "bad", "bat in", "bat on", "bed", "baton in", "baton on", "batting", "Bart in", "Bart on", and "Bort".

As illustrated in FIG. 3, a word result network may start at initial node 310. At node 310, no words may have been recognized yet as the ASR engine 258 commences its processing. From node 310, the ASR engine 258 may create arcs and additional nodes where each arc may be associated with a potential word that may be recognized. In some applications, words may be represented by nodes instead of arcs. In FIG. 3, arcs from node 310 to nodes 320 to 326 are labeled with example words that may be recognized by the ASR engine 258.

From initial node 310, the ASR engine 258 may apply acoustic and language models to determine which of the arcs leaving node 310 are most likely to occur. For an acoustic model employing HMMs, ASR engine 258 may create a separate MINI for each arc leaving node 310. Applying the acoustic and language models the ASR engine 258 may decide to pursue some subset of the arcs leaving node 310. For example, in FIG. 3, the ASR engine 258 may decide to follow the paths starting with "bad", "bat", and "bed" and may decide to stop pursuing the paths starting with "baton", "batting", "Bart," and "Bort" based on the respective scores of those arc, with the ASR engine 258 pursuing only the higher scoring arcs in an effort to concentrate computing resources on the arcs most likely to result in a correct result.

The ASR engine 258 may return an N-best list of paths along with their respective recognition scores, corresponding to the top N paths as determined by the ASR engine 258. An application (such as a program or component either internal or external to the ASR component 250, e.g., the uncertainty component 275 and the alternate utterance component 285) that receives the N-best list may then perform further operations or analysis on the list given the list and the associated recognition scores. For example, the N-best list may be used in correcting errors and training various options and processing conditions of the ASR module 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts. As described below, the N-best list is used by the uncertainty component 275 to determine that an alternate utterance may be beneficial/necessary based on the confidence scores of the hypotheses in the N-best list. The N-best list is also used by the alternate utterance component 285 to determine a rewrite or rephrase of the utterance.

In one aspect of the disclosure, the ASR engine 258 may use a finite state transducer (FST) to perform speech recognition. An FST is a graph that may include all possible words that may be recognized by the ASR engine 258. While the word result network of FIG. 3 may be created dynamically to recognize words, an FST may be static in that it is created in advance and the same FST may be used for the recognition of all utterances.

An FST may include paths for all sequences of words that may be recognized. The creation of an FST may be visualized by starting with the word result network of FIG. 3. The word result network of FIG. 3 may be built out to include all possible utterances that could be recognized by the ASR engine 258. Such a word result network would be potentially unbounded in size unless there was a limitation on the length of utterances that could be recognized. If the lexicon consisted of 100,000 words, there may be 100,000 arcs leaving the initial node of the node of the word result network. For each of the initial words, there may be 100,000 words that could follow. Thus, after only two words, there may be as many as 10 billion paths through the word result network. As utterances of three or more words are included, the size of the word result network will grow considerably larger.

An FST may allow for the recognition of all the words in the above word result network, but may do so with a graph that is smaller than the word result network. An FST may be smaller because it may have cycles and/or it may be determined and/or minimized. An FST may be determined if, for each node in the FST, each arc exiting the node has a different label. An FST may be minimized if it has the minimum number of possible nodes. For example, depending on the application, a given word may appear only once in an FST, and an FST may be cyclical so that a given arc of the FST may be traversed more than once for a single utterance. For other applications, words may appear in an FST more than once so that that context of the word may be distinguished. Although the above example considered an FST of words, an FST may represent sequences of other types, such as sequences of HMMs or HMM states. A larger FST may be created by composing other FSTs. For example, an FST that includes words and phones may be created by composing an FST of words with an FST of phones.

In certain aspects, different finite state transducers (FSTs) are used for different speech processing tasks. One FST may be used for Hidden Markov Model (HMM) operations to input model temporal dynamics of speech such as phone duration (referred to as an "H" FST). Another FST may be used to model phonotactic context dependency (referred to as a "C" FST). Another FST may be the language FST used to map sequences of phones to words (referred to as an "L" FST). Finally, another FST, known as the grammar FST, models individual words to sequences of words that are likely to be used together (referred to as a "G" FST). Thus, the H FST transduces an audio feature vectors (corresponding to audio frames) into context dependent phones, the C FST enforces usage constraints and transduces context dependent phones to context independent phones, the L FST transduces context independent phones to words and the G FST transduces words to words that are likely to make sense together, as according to a language model.

In certain situations certain operations may be grouped into a large FST that incorporates the different operations such as an HCLG FST that incorporates all of the above operations, thus yielding a final search graph that is the composition of the above FSTs. In other situations the operations are grouped differently, where one FST is an HCL FST and another FST is a G FST. This configuration may be useful for domain-specific or user-specific (or other customized) grammars (i.e., G FSTs) that can be swapped in or out for different incoming speech requests, and paired with an existing HCL FST to obtain desired speech results. A user-customized FST may be created by capturing information about how a user interacts with a voice-controlled system and noting what words are typically spoken by a user to a device. The system may then customize an FST by weighting more heavily word sequences frequently spoken by a user and/or including user-favored words in an FST that may otherwise not be included. Further, a domain specific language model may be configured based on the words that may be expected for a particular domain.

An FST may be constructed based on a text corpus that includes a large amount of text representing sentences that may be spoken by users. The FST is thus constructed so that it may represent a large number (though not necessarily infinite) of potential sentences that may be spoken. The FST may be sufficiently granular, however, that each state may represent a particular acoustic unit (such as a senon, phoneme, etc.). Thus, each state of the FST may represent a portion in the progression of potential incoming sounds and how those sounds relate to spoken words. As incoming feature vectors corresponding to audio frames are processed by the ASR engine 258, it may travel from state to state along arcs of the FST. States/arcs that are traversed (and not pruned) are preserved to form a lattice. As each state of the FST is processed by an ASR engine 258, the engine 258 may keep track of the information associated with that portion of the FST (represented by outgoing labels on the arcs between FST states) to build the likely ASR result. Thus, words corresponding to traversed outgoing arcs may be used to construct the lattice, and from the lattice an N best list of potential ASR results.

The FST is thus a directed graph where each arc has certain properties such as input labels, output labels, a score associated with each arc, and an end state where the arc leads. As feature vectors for audio frames are processed by the ASR engine 258, it may traverse the FST to form a lattice representing potential speech recognition results, where the lattice is made up of nodes and/or arcs of the FST that, after traversal by the ASR engine 258, have satisfied the pruning thresholds to be maintained and not discarded. A lattice may also be formed using the acoustic models and language model described above. In the context of an FST, as the ASR engine 258 traverses through states in the FST, it may assign a score to each state or arc on the FST. After traversing an arc, the score of the arc of the FST, the score of the arc may be added to the total cost of the path leading to that arc. To save computational resources, the ASR engine 258 may prune and discard low recognition score states or paths that have little likelihood of corresponding to the spoken utterance, either due to low recognition scores, or for other reasons. Thus, a certain number of states may be preserved for each frame, and those states may be connected to states associated with the next frame (that survived a pruning), thus ultimately resulting in multiple paths through the FST representing potential speech recognition results. These multiple paths may be represented by the lattice, such as the lattice of FIG. 5, discussed below. After traversing the FST, the path with the best score (which may be the highest score or lowest score depending on the configuration of the FST) may be selected as the most likely path.

FIGS. 4A-4D illustrate a different section of an ASR FST. In particular, FIGS. 4A-4D illustrate a small portion of an FST that may be traversed when processing audio data representing speech and determining whether that audio data corresponds to the word "bat" or the word "bad." The FST portion shows a single start state (state 0 shown in FIG. 4A) and multiple end states (states 62, 68, 69, 81, 82, and 83, shown in FIGS. 4C and 4D). In a full FST for speech processing there may be one or multiple start states and many more end states. Further, the end states may be located at various locations throughout the FST to represent different potential end portions that may be received by a potential utterance.

As can be seen in FIGS. 4A-4D, each state has one or more arcs outgoing from it that lead from the particular state to the next state. Each arc is associated with an input label, an output label and a score, shown in the figures as [input label]:[output label]/[score]. Thus, for example, arc 402 outgoing from state 0 to state 2 has an input label of 10, an output label of <eps> (explained below) and a score of 0.15137. The scores illustrated in FIGS. 4A-4D represent scores or "costs" of each arc, where a lower scoring arc represents an arc that is more likely to be traversed/chosen than a higher scoring arc. In the present illustration of FIGS. 4A-4D, the illustrated scores roughly correspond to the negative logarithm of the probability the particular arc may be traversed, but multiple scoring configurations are possible. Further, the scores illustrated in FIGS. 4A-4D represent scores of the arcs in the FST prior to ASR processing. During processing, those scores will be adjusted using the scores of the acoustic model, as explained below. Although the scores illustrated represent one way of scoring arcs, other techniques may also be used. Further, while lower scores illustrated in FIGS. 4A-4D are considered "better," as in, more likely to be selected during ASR, in other configurations higher scores may be considered more likely to be selected.

As noted below, the input labels and output labels of an arc in an FST may include pointers to tables that track the individual labels. Further, for an ASR FST such as that illustrated in FIGS. 4A-4D, the input labels may correspond to individual acoustic speech units such as phonemes or senons or portions thereof. A senon is a grouping of HMM states which represents a particular grouping of phones as may be used together in speech. Each phone may have a number of incrementally different sounds depending on its context (e.g., the surrounding phones). While English may have approximately 50 phones it has several thousand sound groupings represented by senons. Use of senons in ASR processing may allow for improved ASR results. Thus, for example, arc 402 outgoing from state 0 in FIG. 4A has an input label of 10. That may correspond to entry 10 of an input label table, which in term may correspond to a particular phoneme or portion thereof, for example corresponding to a beginning of a "b" sound as might be spoken in "bat." Further remaining input labels on arcs outgoing from state 0 (4 in arc 404 from state 0 to state 3, 5480 in arc 406 outgoing from state 0 to state 5, 16 in arc 408 outgoing from state 0 to state 1, and 2 in arc 410 outgoing from state 0 to state 4) may each represent different acoustic units that may be identified by an acoustic model. In the example of the figures, these input labels may also correspond to different speech units that represent different ways of making a "b" sound. As the FST is traversed during ASR (explained below), the system may use the input labels to determine how to traverse the FST (based on the output from the acoustic model).

The output labels of the arcs may be collected by the ASR engine 258 for eventual use in outputting ASR results. As can be appreciated by FIGS. 4A-4D, however, many arcs have a label <eps> (either as input label or as output label) which represents the label epsilon (E). Epsilon is representative of a null label. That is, arcs with <eps> as an output label, have no output label and thus do not contribute any words to a potential ASR result. Arcs with <eps> as an input label do not need acoustic input to be traversed, and thus may be traversed as part of ASR processing without a new input audio feature vector. For example, if the ASR engine 258 reaches state 10, it may traverse arc 430 from state 10 to state 15 as there is no input label on that arc that refers to an indexed acoustic unit. The ASR engine 258, however, will not traverse arc 432 outgoing from state 15 until a new audio feature vector is processed, as arc 432 has an input label of 5570, which refers to an acoustic unit, thus requiring a new audio feature vector be processed before arc 432 is traversed.

Figure 4A:
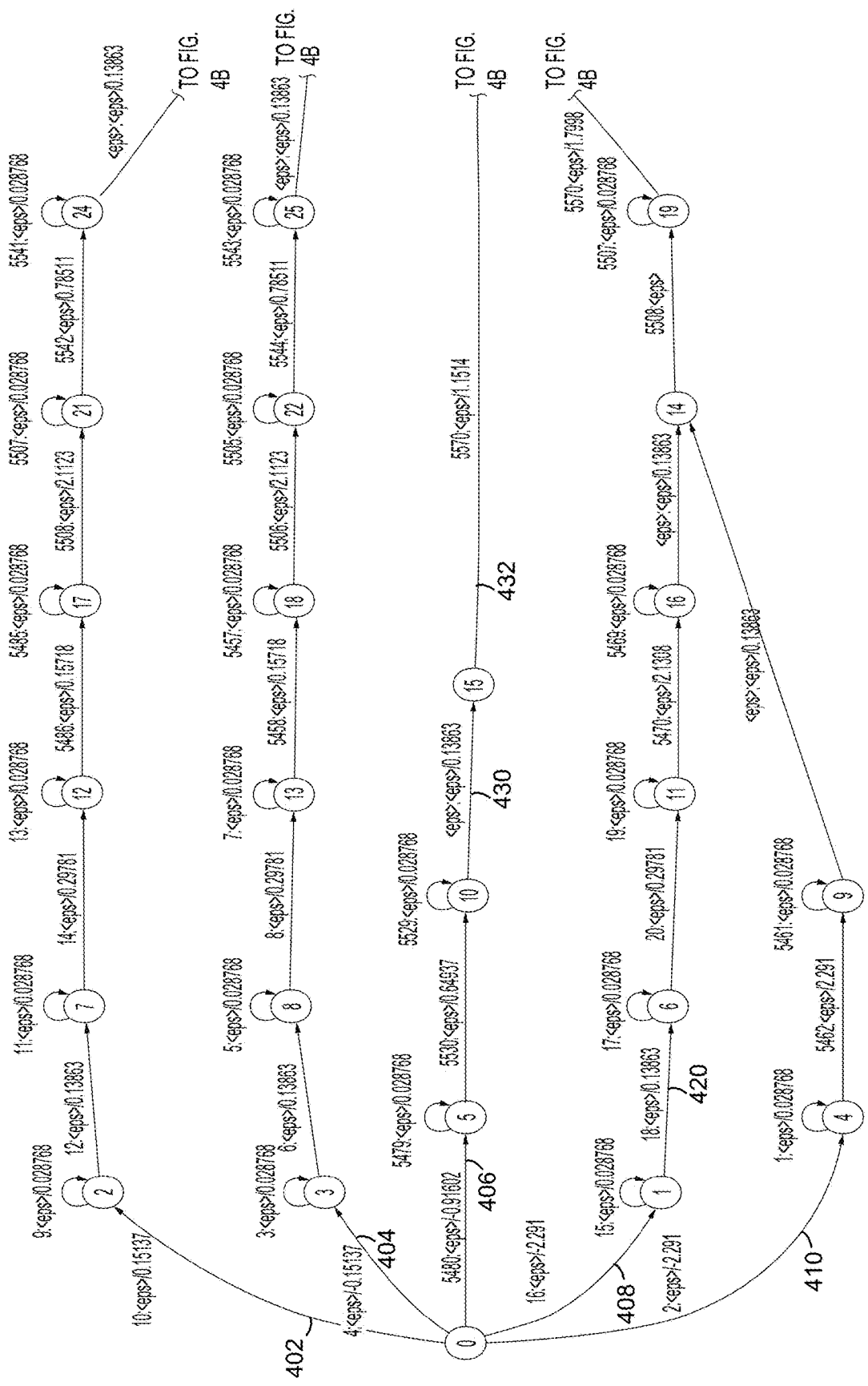
FIGS. 4A-4D illustrate a section of a finite state transducer according to embodiments of the present disclosure.
Figure 4B:
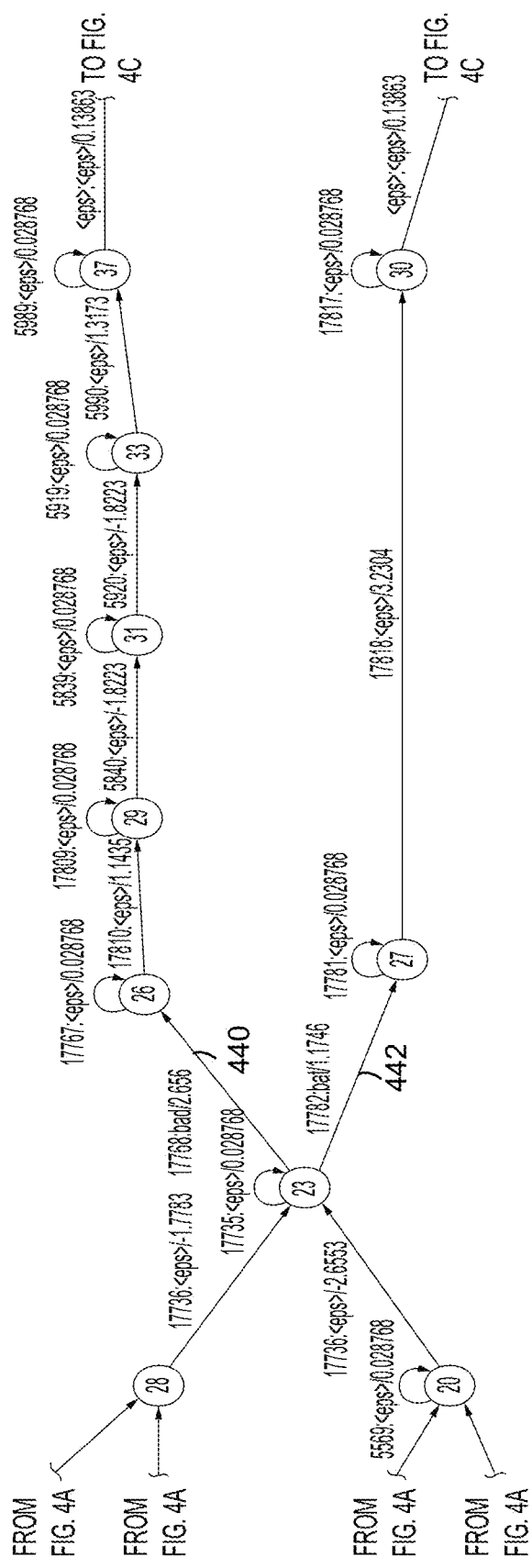
Figure 4C:
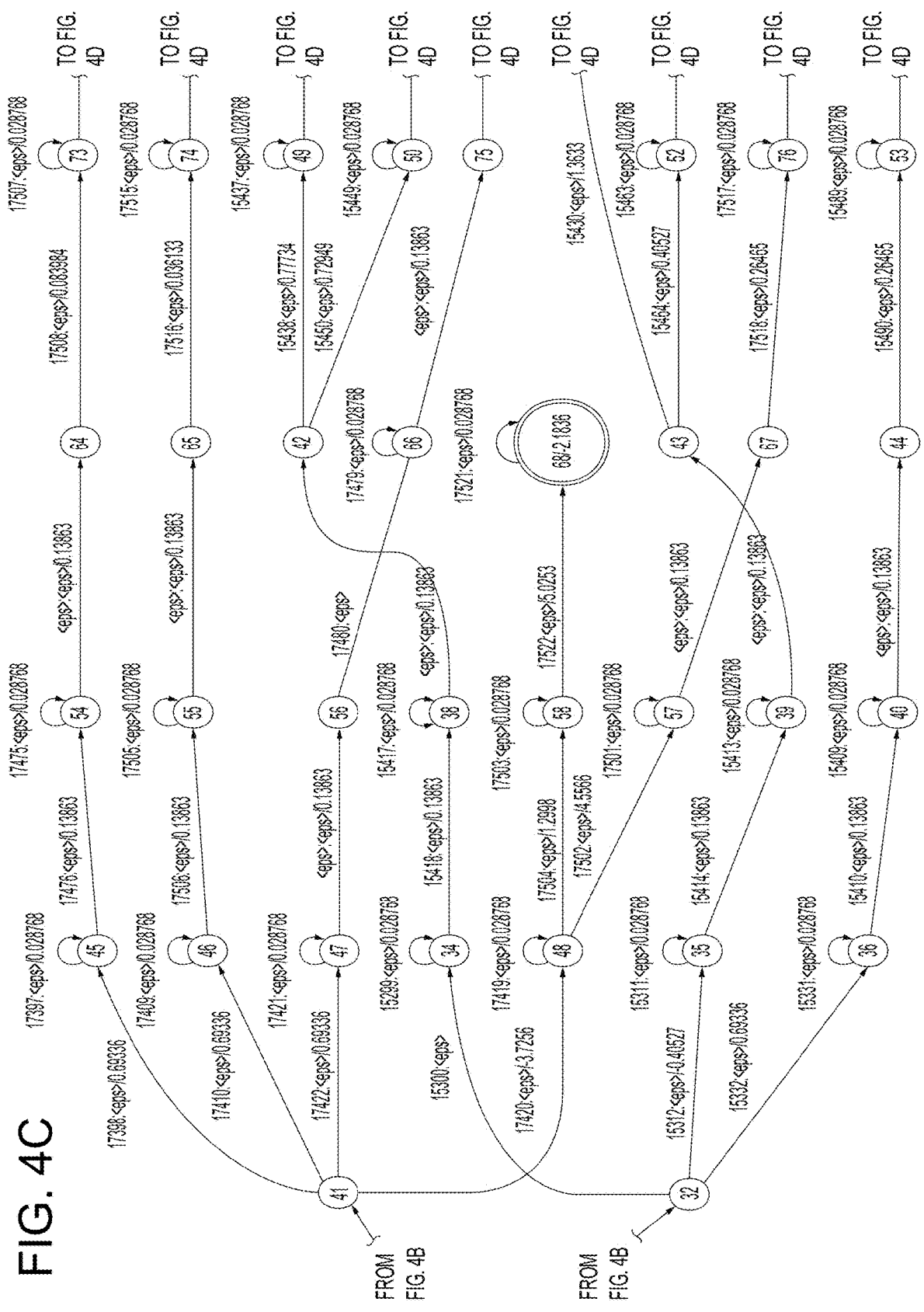
Figure 4D:
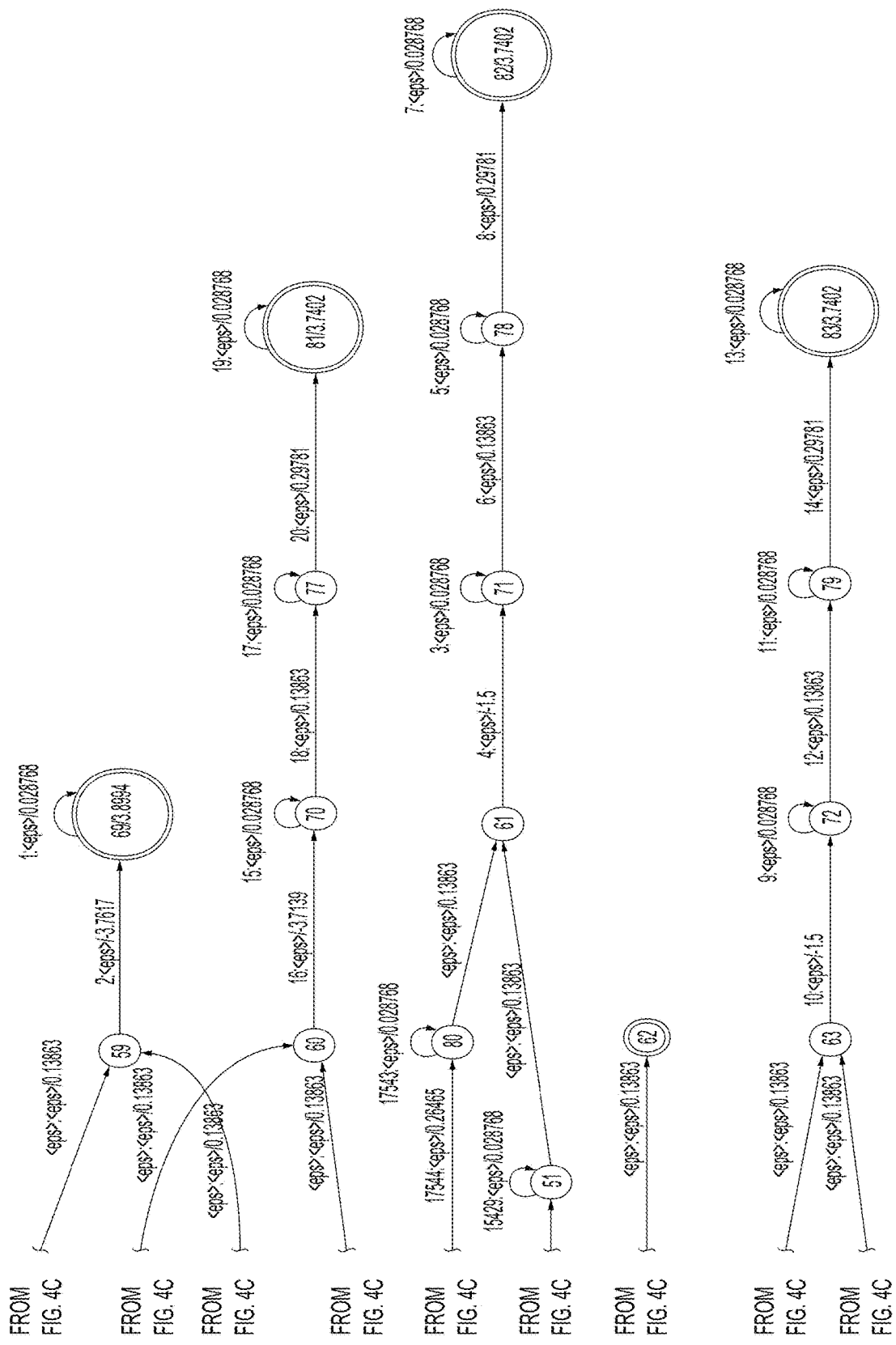

Only certain portions of an FST have an output label. For example, as shown in FIG. 4B, only arcs 440 and 442 have an output label. Arc 440, from state 23 to state 26 has an output label of "bad" and arc 442 from state 23 to state 27 has an output label of "bat." Because the FST portion of FIGS. 4A-4D only illustrate choosing between the words "bad" and "bat", the output labels corresponding to "bad" and "bat" are located at the point in the illustrated FST portion branches between the two words. Thus, only after the speech recognition system 258 has traversed those particular arcs (which can only be reached if the system traverses the arcs before), will the speech recognition system 258 output either the word "bat" or the word "bad" (with a corresponding score) from the FST. As can be appreciated, many states and arcs may be traversed before a word is output using an FST during ASR. This logically follows from the understanding that certain states of an FST may be correspond to a single audio frame, and an audio frame may be only 10 ms long. Thus many frames (and states) need to be processed before a word may be recognized.

Although an FST is a graphical construct as shown in FIGS. 4A-4D, when stored as data in the system, an FST may be represented as data in two or more tables. The two tables include a table of states (also called nodes) and a table of arcs. The FST may optionally include a table of input labels and a table of output labels for particular arcs, though those label tables may be stored separately (and thus not be considered part of) the FST. Though this is configurable. As an example, the state/node table may contain a record for each state/node, with each state record consisting of the following four fields:

(1) Final score of the state,
    (2) Offset in the arc array pointing to the beginning of the list of arcs outgoing from the state,
    (3) Number of outgoing arcs with epsilon (E) input label, and
    (4) Number of outgoing arcs with epsilon (E) output label.

Each of these fields may be represented by a particular N-bit integer (e.g., 16, 32, etc.). The integer size for a particular field may be different from that of a different field.

Thus, to represent a state with many outgoing arcs (for example, state 0 in FIG. 4A) the table entry for state 0 would include a final score of state 0, a pointer to the arc table corresponding to an arc table entry for a first arc outgoing from state 0 (for example 402), a number of outgoing arcs from state 0 with a null epsilon input label and a number of outgoing arcs from state 0 with a null epsilon input label. As FIG. 4A is an incomplete portion of an FST, it does not illustrate all the arcs from state 0 and thus does not show all the arcs containing an epsilon label. Although the entry for state 0 may only include a pointer to a first outgoing arc from state 0, the arc table and state table may be organized so that the entry in the state table for the next state, e.g., state 1, includes a pointer to the arc table for the first outgoing state from state 1, e.g., arc 420. The system may thus determine that any arcs from 402 up to, but not including 420, are outgoing from state 0.

The arcs table may contain the following information for each arc:

(1) Arc score,
    (2) Next state ID (the end point of the arc)
    (3) Input label (which may be a pointer to a label in a table of input labels)
    (4) Output label (which may be a pointer to a label in a table of output labels)

Each of these fields may be represented by a particular N-bit integer. The integer size for a particular field may be different from that of a different field. Thus, to represent a particular arc, for example arc 420, the entry in the arc table may include an arc score (e.g., 0.13863), the next state ID for the arc (e.g., state 6), the input label (e.g., a pointer in a table of input labels to input label 18, which may correspond to a particular acoustic unit), and the output label (which is epsilon and thus may be blank, or set to a particular value that represents epsilon, or may point to an entry in the table of output labels that represents epsilon).

During runtime ASR processing, the ASR engine 258 may take incoming audio feature vectors corresponding to audio frames and may process them with an acoustic model 253. For each processed feature vector, the acoustic model processing will then result in acoustic model output including a list of potential acoustic units corresponding to the feature vector along with a corresponding list of acoustic scores for the respective potential acoustic units. The ASR engine 258 will then identify those acoustic units in the input labels of particular states currently under consideration at the FST and will rescore the arcs associated with those acoustic units using both the acoustic scores and the scores of the arcs built into the FST.

Take, for example, state 0 of FIG. 4A as an active state being considered as part of ASR processing. An incoming feature vector is received by the system and processed by the ASR speech recognition 258 using acoustic model 253. The output of that processing may give certain scores for the acoustic units represented in the input labels of the arcs outgoing from state 0, for example:

unit 10, acoustic score $s_1$
unit 4, acoustic score $s_2$
unit 5480, acoustic score $s_3$
unit 16, acoustic score $s_4$
unit 2, acoustic score $s_5$ The ASR engine 258 may then take acoustic score Si and use it to adjust the existing score (0.84451) of arc 402 (which corresponds to unit 10). The scores may be added together, multiplied, or any other technique of combination. The resulting combined score may then be maintained by the system as the processed score corresponding to arc 402. The same process may be performed for each of the arcs outgoing from state 0 (as each of them have an input label corresponding to an acoustic unit) based on the scores corresponding to the acoustic units of their respective input labels, thus resulting in:

Updated score for 402=0.84451+($s_1$*sf)

Updated score for 404=0.84451+($s_2$*sf)

Updated score for 406=−0.22287+($s_3$*sf)

Updated score for 408=−1.5979+($s_4$*sf)

Updated score for 410=−1.5979+($s_5$*sf)

where sf is a scaling factor configured to adjust the acoustic scores so that they can be added to the scores of the FST. The scaling factor may be based on the particular acoustic model and/or FST. The same scaling factor may also be used to adjust each of the acoustic scores.

The destination states for the arcs processed (for example, states 1-5), may then be held in memory while the ASR engine 258 processes the next incoming feature vector corresponding to the next audio frame. The above process will then be repeated, so the acoustic model processing will output acoustic units with corresponding scores, the engine 258 will identify the corresponding units in input labels in arcs outgoing from FST states under consideration by the engine 258, the combines scores will be determined and stored. The process will continue in this manner for all input audio.

As the ASR engine 258 traverses the FST it will continue traversing states and arcs until it reaches a state with an outgoing arc, where the outgoing arc includes an input label corresponding to an acoustic unit, which thus means the arc requires new information from the acoustic model to be traversed. For example, the ASR engine 258 may continue to traverse arcs until it arrives at an arc that has an input label corresponding to an acoustic unit. The ASR engine 258 will then wait for the next feature vector to be processed and for further input to come from the acoustic model until it continues processing. In this manner the speech recognition engine will perform time-synchronous decoding and will only consider portions of the FST in a frame-by-frame manner. That is, all the portions of the FST being processed at a particular time will all correspond to the same input audio frame/feature vector.

Further, as the ASR engine 258 traverses the FST, it may accumulate the combined scores for each path of the traversed nodes and/or arcs traversed up to each point in the FST. The combined score may be a sum of the updated scores (i.e., post acoustic model scores) of each state and/or arc traversed. For example, referring to the portion of the FST shown in FIG. 4A, if the ASR engine 258 has traversed along five paths to the point where it is currently at states 7, 8, 10, 6 and 9, each path will have a combined score leading up to the that point in the path. That is, the combined score for path 1 (currently at state 7) will be the summed updated scores for the nodes and arcs leading from state 0 to state 7, the combined score for path 2 (currently at state 8) will be the summed updated scores for the nodes and arcs leading from state 0 to state 8, the combined score for path 3 (currently at state 10) will be the summed updated scores for the nodes and arcs leading from state 0 to state 10, the combined score for path 4 (currently at state 6) will be the summed updated scores for the nodes and arcs leading from state 0 to state 6, and the combined score for path 5 (currently at state 9) will be the summed updated scores for the nodes and arcs leading from state 0 to state 9.

As the ASR engine 258 operates, there are certain pruning settings that affect how many states the engine 258 may consider. One such pruning setting is the beam width. The beam width is a measurement of the score difference between a best scoring state (corresponding to the particular audio frame being processed) and the cutoff point.

When the ASR engine 258 has completed processing for a particular feature vector, that is the engine 258 has processed the output from the acoustic model for the feature vector and rescored all the arcs and states corresponding to the acoustic units/scores output by the acoustic model (while discarding those that fall outside the beam width), there may be a certain number of states left within the beam that have received their combined scores. (Though note that not every state/arc will receive a combined score, only those that correspond to acoustic units seen by the AM will receive a combined score.) As the ASR engine 258 will continue to traverse arcs and states until a new acoustic unit is indicated as an input label, the states remaining after processing data for a particular audio frame will have outgoing arcs that correspond to an acoustic unit. Those outgoing arcs for those states will then be considered by the ASR engine 258 as new data for the next feature vector comes from the acoustic model processing.

The number of such states, however, may be very large which may result in significant processing by the ASR engine 258. Thus, the engine 258 may use a different pruning setting, namely a threshold number of active states. The threshold number of active states indicate the threshold number of states the ASR engine 258 will consider after processing acoustic model data from a first audio frame before it considers acoustic model data from a next audio frame. That is, if a threshold number of active states is 1000, and after processing data for a first audio frame, the engine 258 is considering 1,250 states corresponding to the first audio frame, the speech recognition engine will discard 250 states before beginning processing of data corresponding to the next audio frame. The discarded states are the states that have the lowest scores among the remaining active states (even if the discarded states were within the beam width). Thus, the maximum number of states keeps the ASR engine 258 from being overwhelmed as it transitions from frame to frame.

As the ASR engine 258 traverses the FST it may store data corresponding to the states and arcs traversed along with their combined scores. That may include a table of entries, sometimes called tokens, where each token corresponds to a state in the search space (i.e., the traversed portions of the FST that fell within the beam width and the threshold number of active states). Each token may include a score representing the likelihood that the state is reached from the beginning of the utterance up until the frame of the state. The token may also include a pointer in the table to a previous state, such as the state most likely to lead to the present state, and the arc from the most likely previous state to the present state. The token may also include the input label and output label (if any) of the arc that leads from the most likely previous state to the present state. The input label and/or output label may be a pointer to a table of labels and may indicate a phoneme, senon, word, or other speech unit. The token may also include links to more than one previous state (and corresponding scores, arcs, labels, etc.).

Figure 5:
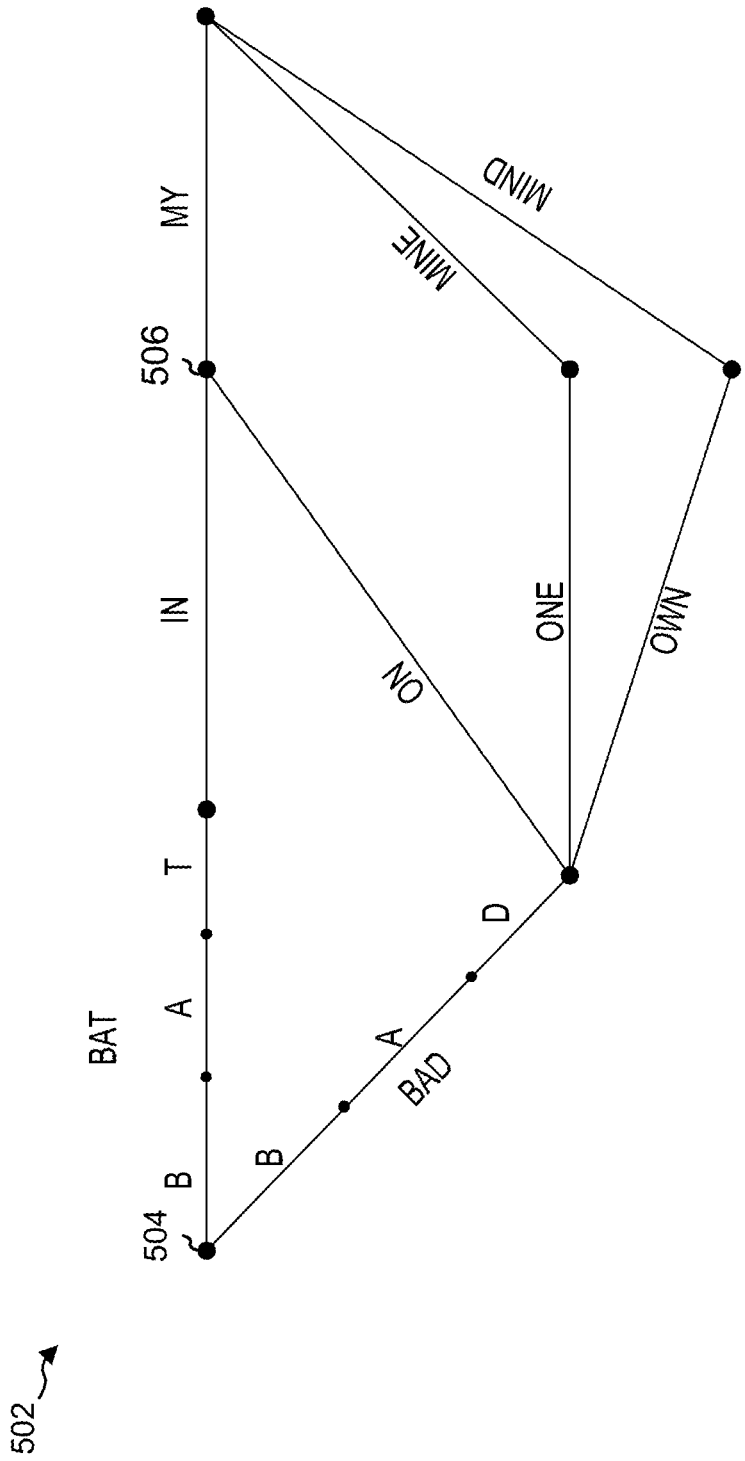
FIG. 5 illustrates a word lattice according to embodiments of the present disclosure.

As the ASR engine 258 traverses portions of the FST, it may use the table of tokens representing the states and arcs traversed, along with their combined scores, to create a lattice of potential paths representing potential ASR results. A sample lattice is shown in FIG. 5. The lattice 502 shows multiple potential paths of speech recognition results that may have been determined by the ASR engine 258 by traversing an FST or by using different acoustic model/language model processing. Paths between large nodes represent potential words (for example "bad", "bay", etc.) and paths between smaller nodes represent potential phonemes (for example "B", "A", "T", and "B", "A", "D"). For purposes of illustration, individual phonemes are only shown for the first two words of the lattice. The two paths between node 504 and node 506 represent two potential word choices, "bat in" or "bad on". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the ASR engine 258 as the ASR result for the associated feature vectors. Following ASR processing, the ASR results may be sent to a downstream component, such as a skill(s) component 290 for further processing (such as execution of a command included in the interpreted text). Thus the data preserved by the ASR engine 258 during traversal of the FST may result in a lattice representing the most likely ASR results (as the least likely results were discarded during pruning). The mostly likely path of the ASR results, sometimes called the Viterbi path, may be selected as the top scoring result for command execution.

FSTs can constitute the bulk of an ASR model, with HCLG being particularly large, sometimes reaching tens of gigabytes in some models. As noted above, an HCLG functionality maybe incorporated into a single FST. In other configurations, HCL functionality may be incorporated in one FST, whereas G functionality (i.e., functionality of a grammar or language model) may be incorporated into a different FST. In such a situation, an HCL FST is traversed using output from an acoustic model (as generally described above) to traverse the HCL FST, with the resulting output being one or more potential words and corresponding scores. When the end of a word is reached the HCL FST is traversed again anew (using further acoustic model output) for the next word. Each word(s) and corresponding score(s) from the HCL FST is then output for the system to use traverse the G FST. The G FST represents the possible word groupings (e.g., sentences) that the system may expect to receive. The G FST (or other form of language model) is constructed based on the universe of example text used by the system when building the language model.

Figure 6:
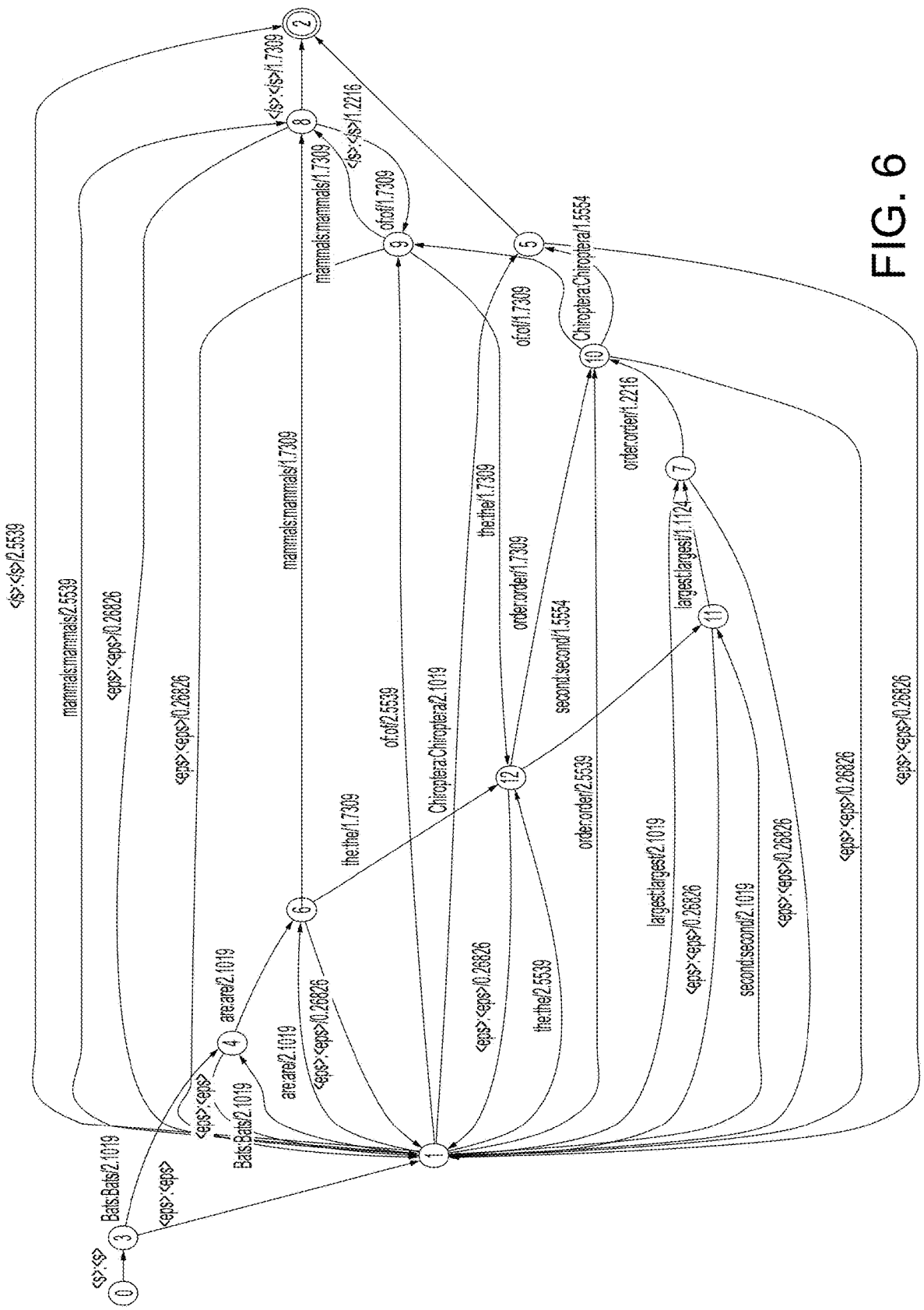
FIG. 6 illustrates a section of a finite state transducer according to embodiments of the present disclosure.

An example of a portion of a G FST is shown in FIG. 6. The FST portion shown in FIG. 6 is a portion of a G FST language model constructed from two sentences, the first being "bats are mammals of the order Chiroptera" and the second being "bats are the second largest order of mammals." The portion of the FST shown in FIG. 6 may normally appear in a much larger FST as part of a general ASR language model, but is shown in FIG. 6 for purposes of illustration. Further, while a complete G FST may be configured to recognize any sequence of the words shown in FIG. 6, the particular illustrated sequences may be more likely due to the construction of the FST (which itself is based on a universe of available text from a text corpus). To traverse the G FST, word outputs from an HCL FST (or other model configured to construct words from sounds output by an acoustic model) are used to determine which arcs to traverse along the G FST. As arcs are traversed, word output labels associated with those arcs are output to form the potential text output that is eventually output as the ASR result. Multiple paths through a G FST may be traversed (with respective scores) thus resulting in an N-best list output of a word string (e.g., a sentence) that potentially represents the input audio data.

Although a G FST may have an arbitrary structure, a language model may have an N-gram model. An N-gram is an ordered sequence of N words. Thus, a size 2 N-gram (also called a bi-gram) includes two words in order for example "I am," "I think," or the like. A size 3 N-gram (also called a trigram) includes three words in order for example "I like to," "I need to," or the like. Certain benefits to representing word groupings as N-grams in a language model FST include their ease of construction, fast computation during runtime decoding of input speech and efficient representation within the FST.

Figure 7:
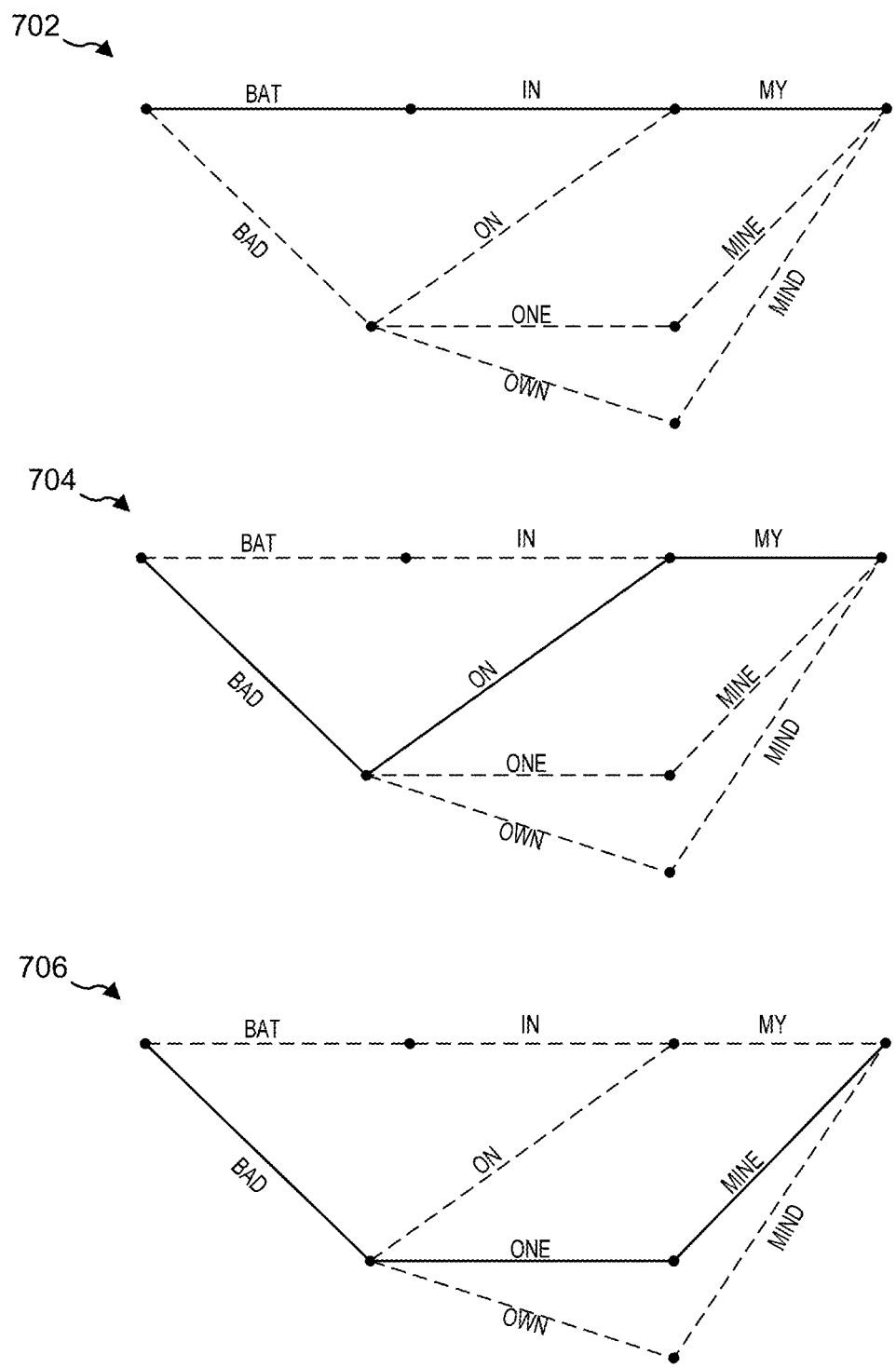
FIG. 7 illustrates different ways of traversing the lattice of FIG. 5 according to embodiments of the present disclosure.
Figure 8:
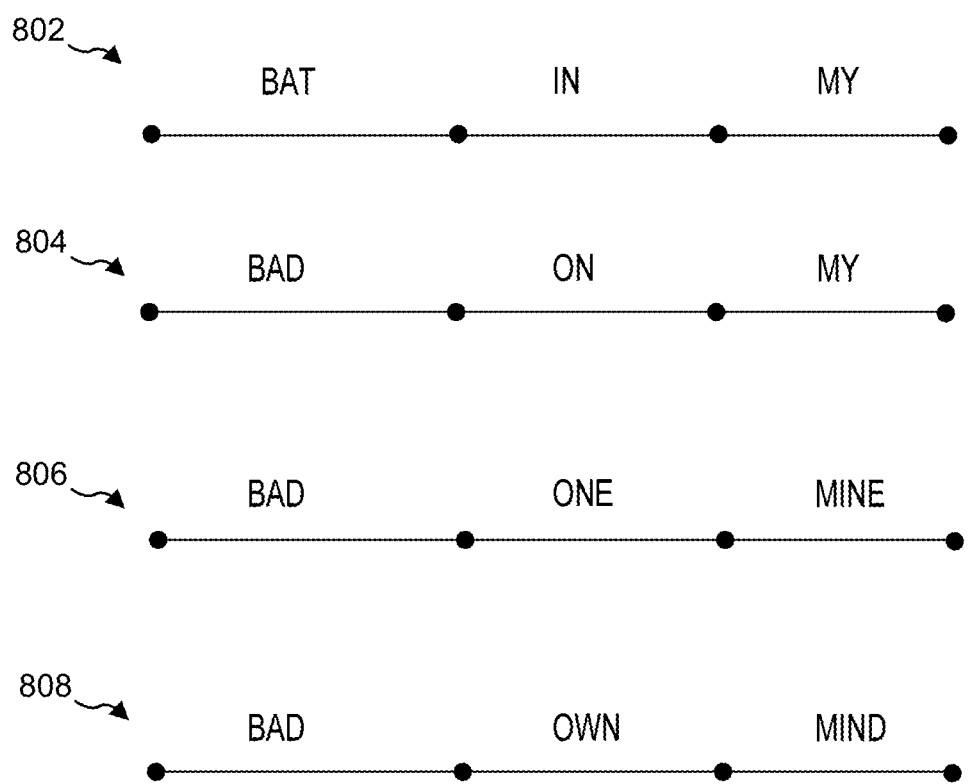
FIG. 8 illustrates an N-best list of hypotheses associated with the lattice of FIG. 5 according to embodiments of the present disclosure.

To simplify the illustration of traversing different path results, illustrated in FIG. 7 are different potential paths along the lattice 502. As shown in FIG. 7, path 702 results in "bat in my," path 704 results in "bad on my" and path 706 results in "bad one mine." As can be seen, many such paths are possible even in the small example lattice 502. An example of such paths 802, 804, 806, and 808 are shown in FIG. 8. It is not uncommon for a speech recognition process to consider many thousands of different paths, i.e., hypotheses, when performing speech processing. Each hypotheses may be associated with a score, ranking it relative to other hypotheses. The score may be based on the input audio data, the processing from the acoustic model, the training of the language model, etc. As noted above, an ASR component (such as component operating a language model) may output an N-best list, such as the list of potential results shown in FIG. 8, may output a single top scoring answer (e.g., 802) or may output an entire lattice as well as corresponding scores.

In addition to the traditional top sentence of words or N-best result, an ASR component may be configured to output various data calculated by the ASR component during processing. Such data may include, for example, speech units (such as phones), probabilities/scores associated with certain speech units or words, audio frame timing, or the like. A system may be configured to use such data to perform various tasks, for example to confirm the results of ASR processing, which may in turn be used to perform various processing to update a store of facts and information available to a system for query answering.

To perform ASR effectively, however, certain techniques may be employed to incorporate certain information in ASR processing, such as ASR N-best hypotheses. One such technique, for example, is use of an encoder. Encoding is a general technique for projecting a sequence of features into a vector space. One goal of encoding is to project data points into a multi-dimensional vector space so that various operations can be performed on the vector combinations to determine how they (or the data they contain) relate to each other. For example, if usage of two sentences such as "What's the weather today?" and "Is it going to rain today?" are projected into a vector space (where each vector is populated with data points representing how or when the sentences are used), the two sentences would likely end up being close to each other in the vector projection space, thus representing the similar usage of the two sentences. It can be valuable to encode certain features into a vector space to perform various operations.

A word sequence is usually represented as a series of one-hot vectors (i.e., a N-sized vector representing the N available words in a lexicon, with one bit high to represent the particular word in the sequence). The one-hot vector is often augmented with information from other models, which have been trained on large amounts of generic data, including but not limited to word embeddings that represent how individual words are used in a text corpus, labels from a tagger (e.g., part-of-speech (POS) or named entity tagger), labels from a parser (e.g., semantic or dependency parser), etc.

Components of the system (such as the alternate utterance component 285) may be configured to use word embeddings in their operations. A word embedding is a representation of a word in the form of a multi-dimensional data vector, where each dimension represents some data point regarding the word, its usage, or other information about the word. To create word embeddings a text corpus is obtained that represents how words are used. The text corpus may include information such as books, news content, internet articles, etc. The system then creates multiple vectors, each corresponding to the usage of a particular word (e.g., the usage of the word in the source text corpus), and map those vectors into a vector space. Given the number of dimensions for each vector, the vector space may be a high dimensional vector space. The different dimensions for each data vector may correspond to how a word is used in the source text corpus. Thus the word embedding data represented in the individual values of a word embedding data vector may correspond to how the respective word is used in the corpus.

A number of known techniques for manipulating vectors in high dimensional (or other) vector space may be used to analyze vectors and compare vectors to each other. One example for representing and analyzing word usage characteristic as vectors with word embedding data is the GloVe: Global Vectors for Word Representation project by Jeffery Pennington, Richard Socher, and Christopher D. Manning of the Computer Science Department of Stanford University published in 2014. Other word embedding techniques and/or formats may be used. Further, vectors are one example of tracking and comparing word usage characteristics, other techniques may be used.

Figure 9:
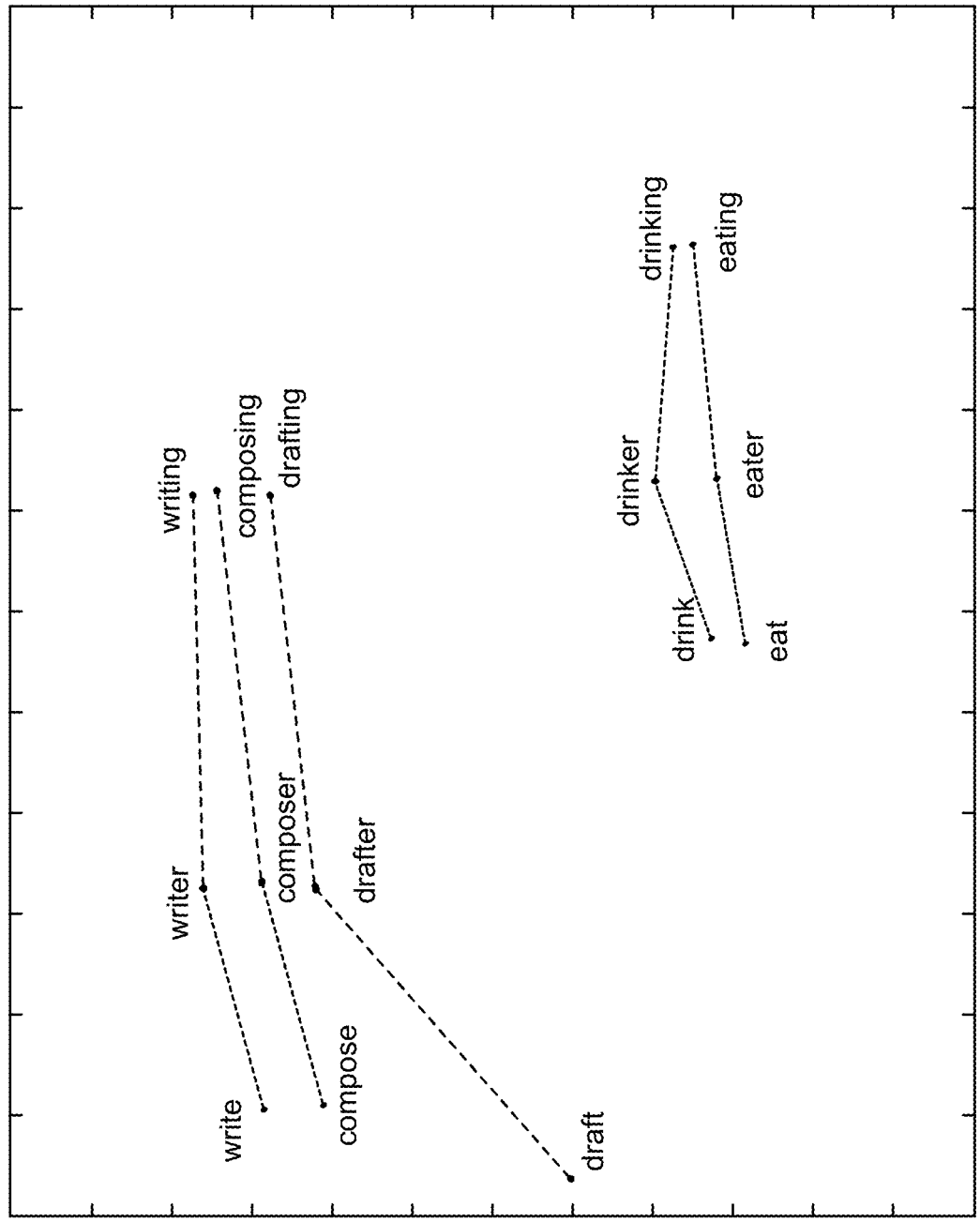
FIG. 9 illustrates representations of word usage similarity in a vector space.

Representing words in a vector space may be useful for showing the relationship between usage of individual words, as well as showing the relationship between usage of variations of a particular word and showing the relationship between the same usage variation across different word roots. Thus, a vector space may be used to represent sematic relationships between words as geometric relationship between vectors. For example, FIG. 9 illustrates a number of words in a hypothetical vector space where each point represents the vector location for the particular word. Although illustrated as located in a two-dimensional graph for discussion purposes, the usage vectors for the words illustrated in FIG. 9 would be in a high dimensional space. Further, FIG. 9 is shown for example purposes only and the vector locations/relationships do not necessarily reflect a true graphing of the usage of the illustrated words.

As illustrated in FIG. 9, certain words that have similar meaning may be close to each other in the vector space (indicating a similarity of usage characteristics). Also, certain words that have different meanings may also be close to each other in the vector space (also indicating a similarity of usage characteristics). In the top portion of the illustration, words "writer," "composer" and "drafter" are located near each other, indicating that those three words are used similarly in the word data used to generate the vectors of FIG. 9. Similarly, the words "writing," "composing" and "drafting" are also located near each other, also indicating that those three words are used similarly. The words "write," "compose," and "draft" are not as close in the illustration, with "draft" in particular being located farther away from "write" and "compose" than those words are to each other. This distance may be due to other uses of the word "draft" that may differ from "write" and "compose," for example, "draft" has a known noun form, where the "write" and "compose" do not and "draft" may also have other meanings (such as a cold interior breeze) that differ from "write" and "compose."

Further, the variations of the words (save for "draft") have similar usage relationships relative to each other. For example, the usage relationships of "write" to "writer" to "writing" is similar to the usage relationship between "compose" to "composer" to "composing" as shown by the lines connecting those triplets of words. Other, non-illustrated variations may also exist (such as "writes," "drafted," etc.) with their own vectors and usage relationships to other words.

Creating word embeddings may be an intensive process and thus a pre-trained word embedding system may be used for multiple NLU processes. One such word embedding format is GloVe, mentioned above. Others include word2vec described in Distributed Representations of Words and Phrases and their Compositionality by Tomas Mikolov, Kai Chen, Greg Corrado, and Jeffrey Dean, published in 2013, fasttext described in Enriching Word Vectors with Subword Information by Piotr Bojanowski, Edouard Grave, Armand Joulin, and Tomas Mikolov in 2016, and others.

One or more of the herein described system(s) 120 components may implement one or more trained machine learning models. Various machine learning techniques may be used to train and operate such models. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the trained models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 10:
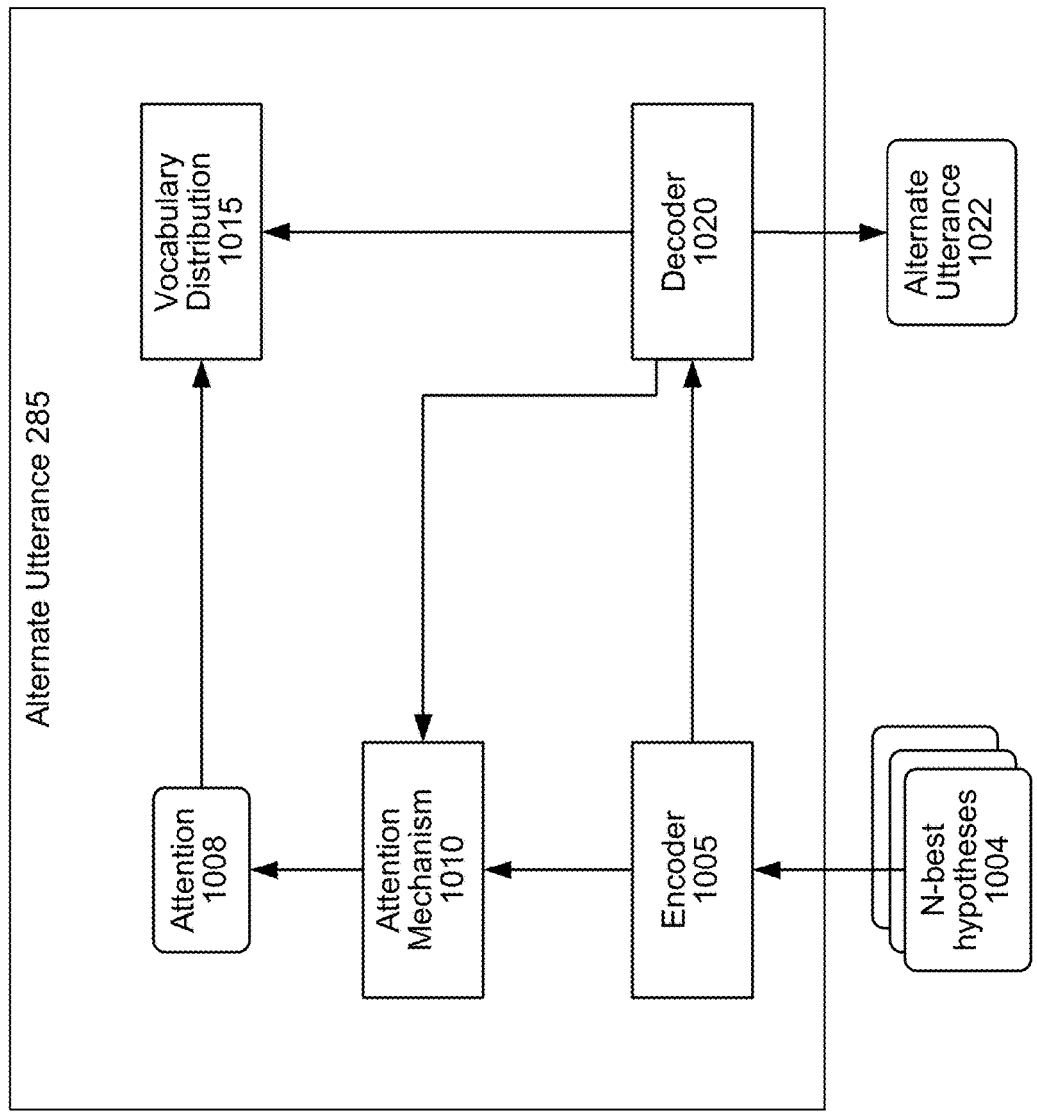
FIG. 10 is a conceptual diagram of alternate utterance components according to embodiments of the present disclosure.
Figure 11:
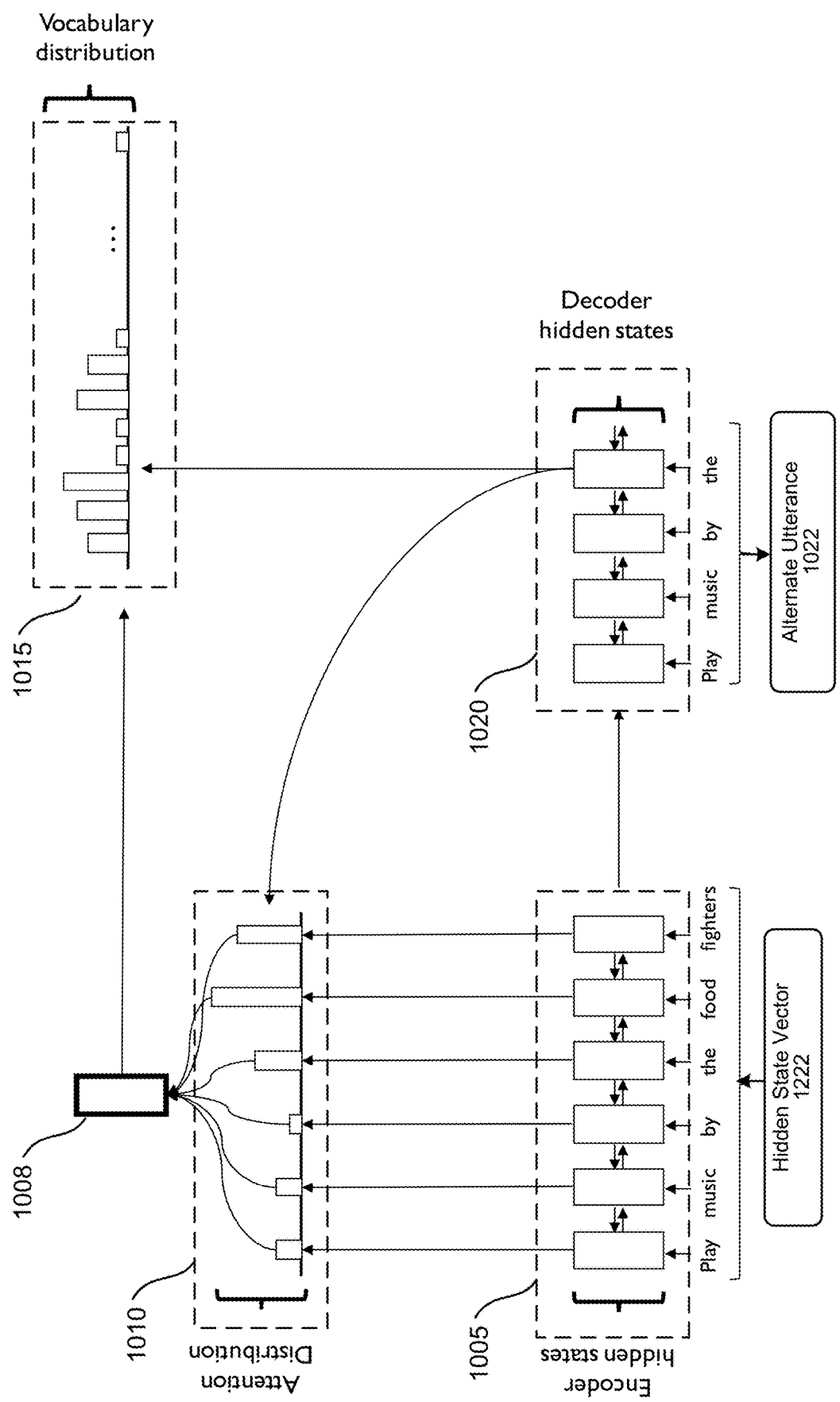
FIG. 11 illustrates how the alternate utterance component may process an input.

FIG. 10 is a conceptual diagram of alternate utterance components according to embodiments of the present disclosure. FIG. 11 illustrates an example of how the alternate utterance component 285 may process an input utterance/hypothesis. The alternate utterance component 285 may include an encoder component 1005, an attention mechanism component 1010, a vocabulary distribution component 1015 and a decoder component 1020. The alternate utterance component 285 may employ a neural sequence-to-sequence architecture to generate an alternate utterance 1022.

The input to the alternate utterance component 285 and the encoder component 1005 may be two or more N-best hypotheses 1004 generated by the ASR component 250 as described above. The encoder component 1005 is configured to encode the N-best hypotheses into a single data vector (e.g., 1222 as discussed below) that can be used by the other components of the alternate utterance component 285. The encoder component 1005 encodes the N-best hypotheses as a sequence of tokens, where each token has its own hidden state data. As used in the present example, a "token" refers to a "word" in the hypothesis but it may refer to different phonetic units such as phonemes, senons, or the like. The encoder component 1005 may encode the N-best hypotheses using a bi-directional Long Short-Term Memory (LSTM) neural network. Further details of the encoder component 1005 are described below in connection with FIG. 12.

The attention mechanism component 1010 is configured to "attract" attention to certain parts and/or draw attention away from certain parts of the encoded hypothesis data. The vocabulary distribution component 1015 is configured to manage a set of words making up the vocabulary from which the alternate utterance component 285 chooses words to determine the alternate utterance 1022.

The decoder component 1020 is configured to generate a rewritten utterance token-by-token. The decoder component 1020 may generate a token from a mixture distribution of the vocabulary distribution component 1015 and the attention mechanism component 1010. The data from the vocabulary distribution component 1015 may be weighted by a generation probability $P_{gen}$ and the data from the attention mechanism component 1010 may be weighted by $1-P_{gen}$. Thus, the decoder component 1020 can generate tokens/words that occur in the input utterance but may not be included in the vocabulary distribution component 1015, which is particularly helpful when the input includes rare words such as names or locations. As used herein, the input utterance is based on the tokens represented in the hidden state vector 1222. Thus, as shown in FIG. 11, the tokens represented in vector 1222 are "play", "music", "by", "the", "food" and "fighters". Further details on how the vector 1222 is determined are described in connection with FIG. 12. The decoder component 1020 may include a trained machine learning model, in particular, a single layer unidirectional LSTM.

On each time-step t, the decoder component 1020 receives the hidden state data associated with the previous token/word, and has decoder state $s_t$. The attention mechanism component 1010 may calculate an attention distribution according to the below equations:

$$e_i^t = v^T \tanh W_h h_i + W_s s_t + b_{attn} \qquad \text{Equation 1}$$

$$a^t = \text{softmax}(e^t) \qquad \text{Equation 2}$$

where v, $W_h$, $W_s$, and $b_{attn}$ are learnable parameters. The attention distribution may be viewed as a probability distribution over the words represented in the vector 1222 that informs the decoder component 1020 where to look to produce the next word for the alternate utterance 1022. The attention mechanism component 1010 may produce a weighted sum of the hidden states represented in the vector 1222, known as an attention vector $h_t^*$ (1008):

$$h_t^* = \Sigma_i a_i^t h_i \qquad \text{Equation 3}$$

The attention vector 1008, which may be a fixed-size representation of which words have been processed, may be concatenated with the decoder state $s_t$ and fed through two linear layers to produce the vocabulary distribution $P_{vocab}$:

$$P_{vocab} = \text{Softmax}(V'(V[s_t, h_t^*]+b)+b') \qquad \text{Equation 4}$$

where V, V', b and b' are learnable parameters. The vocabulary distribution component 1015 may be configured to determine $P_{vocab}$, which may be a probability distribution over all words in the vocabulary, and may provide a final distribution for use by the alternate utterance component 285:

$$P(w) = P_{vocab}(w) \qquad \text{Equation 5}$$

For each decoder time-step, the alternate utterance component 285 calculates a generation probability $P_{gen} \in [0,1]$, which weighs the probability of generating words from the vocabulary, versus copying words represented in the input vector 1222. The vocabulary distribution and the attention distribution are weighted and summed to obtain the final distribution, from which the alternate utterance 1022 is determined. The generation probability for time-step t is calculated from the attention vector $h_t^*$ (1008), the decoder state $s_t$ and the decoder input $x_t$:

$$p_{gen}=\sigma(w_h^T \cdot h_t^* + w_s^T s_t + w_x^T x_t + b_{ptr})\qquad\text{Equation 6}$$

where vectors $w_h^*$, $w_s$, $w_x$ and scalar $b_{ptr}$ are learnable parameters and a is the sigmoid function. Next, $p_{gen}$ is used as a soft switch to choose between generating a word from the vocabulary distribution by sampling from $P_{vocab}$, or copying a word from the input vector 1222 by sampling from the attention distribution at. For each input vector 1222 the extended vocabulary may denote the union of the vocabulary maintained by the vocabulary distribution component 1015 and all words appearing in the input vector 1222.

The following probability distribution over the extended vocabulary is determined:

$$P(w)=p_{gen}P_{vocab}(w)+(1-p_{gen})\Sigma_{i:w_i=w}a_i^t\qquad\text{Equation 7}$$

noting that if w is an out-of-vocabulary word then $P_{vocab}(w)$ is zero. Similarly, if w does not appear in the input utterance, then $\Sigma_{i:w_i=w}a_i^t$ is zero.

Figure 12:
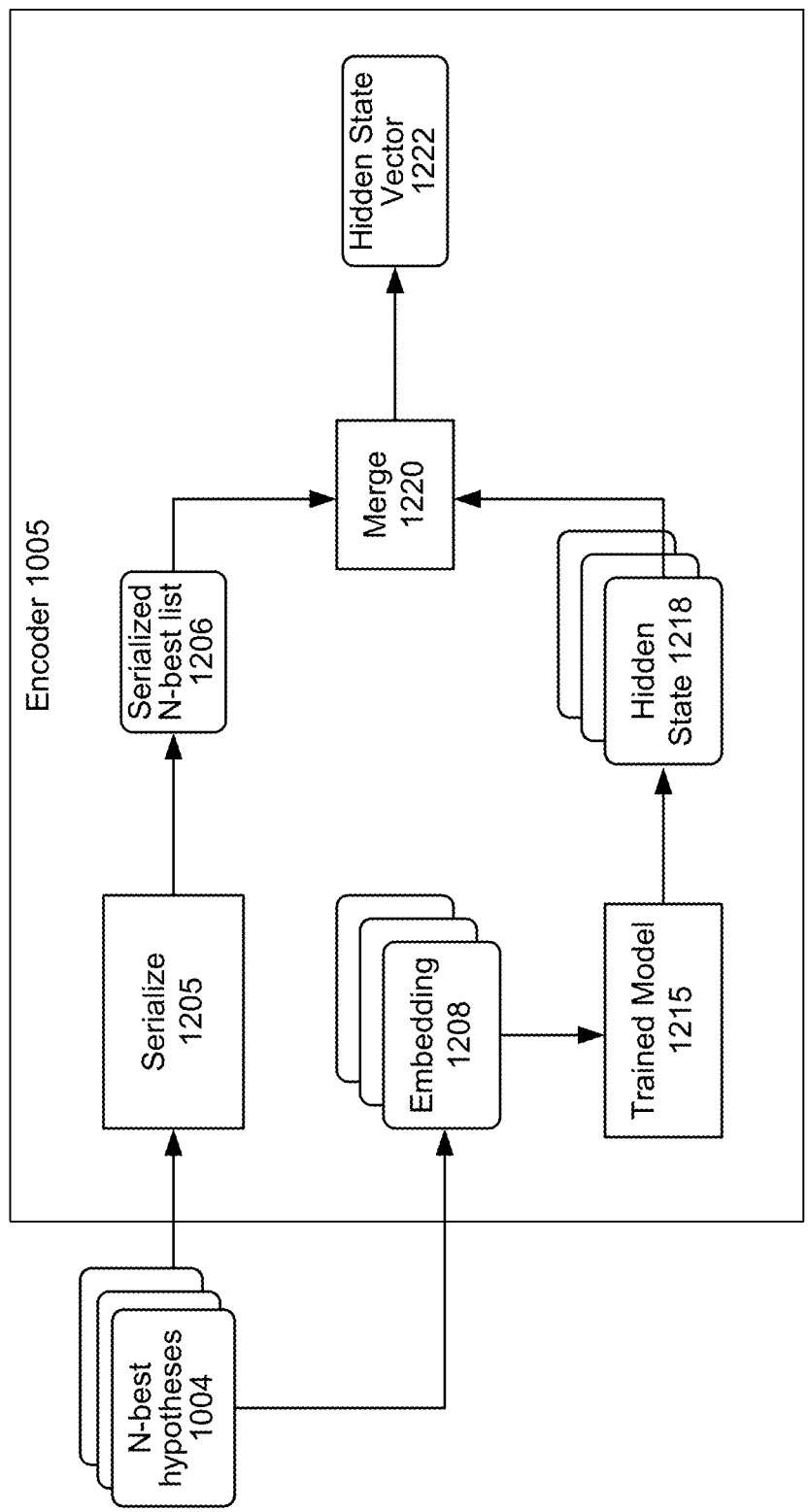
FIG. 12 is a conceptual diagram of encoder components for the alternate utterance component according to embodiments of the present disclosure.

FIG. 12 is a conceptual diagram of encoder components for the alternate utterance component according to embodiments of the present disclosure. The encoder component 1005 may include a serialize component 1205, a trained model 1215 and a merge component 1220.

The N-best list hypothesis(es) 1004 generated by the ASR component 250 may be inputted into the serialize component 1205. The serialize component 1205 is configured to align the hypotheses of the N-best list for further processing. In an example embodiment, the hypotheses are aligned based on the tokens. In other embodiments, the hypotheses may be aligned using multi-sequence alignment algorithms. After the hypotheses are aligned, the serialize component 1205 serializes the hypotheses by chaining or linking the same tokens that appear in the hypotheses and by also recording which hypothesis the token appeared in. The serialized hypotheses are stored as serialized N-best list 1206.

The encoder component 1005 generates a word embedding(s) 1208 corresponding to a respective N-best hypothesis(es) 1004. The word embedding 1208 is a representation of a word in the hypothesis 1004 in the form of a multi-dimensional data vector, where each dimension represents some data point regarding the word, its usage, or other information about the word. The word embeddings may be generated as described above in connection with FIG. 9. For example, the word embeddings 1208 may be a 256-dimensional data vector representing the word embedding.

The trained model 1215 is configured to process the word embedding(s) 1208 to extract token-level hidden states 1218. Due to the other words in a hypothesis and the position of the token, the hidden state associated with a token in one hypothesis may be different than the hidden state associated with the token appearing in another hypothesis. The trained model 1215 may be a neural network, in particular a bi-directional LSTM. The trained model 1215 may be a single layer bi-directional LSTM with 512-dimensional hidden states.

Prior to run-time, a machine learning (ML) model is trained using a training dataset to determine the trained model 1215. The training dataset may include pairs of utterances, where the pair includes a first defective/failed utterance and a second successful utterance with the same intent. The training dataset may also include an N-best list associated with each pair of utterances, where the N-best list is generated by the ASR component 250 when the first defective utterance was processed. The training dataset may further include the first best hypothesis generated by the ASR component 250 when processing the second successful utterance. Thus, the training dataset includes a pair of utterances (representing an input utterance and the corresponding rewrite utterance), the N-best list corresponding to the input utterance and the first best hypothesis corresponding to the rewrite utterance.

The merge component 1220 merges the token-level hidden states 1218 using the serialized N-best list 1206 to generate a hidden state vector 1222. For example, the merge component 1220 merges the hidden states associated with the particular token appearing in multiple hypotheses. In an example embodiment, the merge component 1220 aggregates or sums the hidden states of the same tokens. In another embodiment, the merge component 1220 averages the hidden states. For example, the merge component 1220 may aggregate the hidden state 1218*a* of token 1 (e.g., "play") in hypothesis 1004*a* and the hidden state 1218*b* associated with "play" in hypothesis 1004*b*, and divide it by 2 to determine the average of the hidden states of the token "play." In yet another embodiment, the merge component 1220 may determine a weighted average of the hidden states of the token. The weighted average may be determined by weighting the hidden state of the token using a weight or score of the respective hypothesis. For example, the weighted average of the hidden states may be determined by multiplying the hidden state 1218*a* of the token "play" in hypothesis 1004*a* by the score (generated by the ASR component 250) associated with the hypothesis 1004*a*, and multiplying the hidden state 1218*b* of "play" in hypothesis 1004*b* by the score associated with the hypothesis 1004*b*, and then aggregating the weighted hidden states and dividing by 2. If the token only appears in one hypothesis, then the hidden state associated with that token is stored as-generated by the trained model 1215 in the vector 1222. The dimension of the hidden state vector 1222 may be determined by the number of unique tokens in the N-best hypothesis(es) 1004. In this manner, the hidden state vector 1222 represents encoded features or parameters associated with a token based on the N-best hypotheses. Thus, the system incorporates the features and data associated with the N-best hypotheses (rather than just one hypothesis) to rephrase the utterance. The merge component 1220 uses the serialized N-best list 1206 for guidance to determine which hidden states of which tokens are to be merged.

The hidden state vector 1222 is processed by the decoder component 1020 and the attention mechanism 1010 to generate the alternate utterance 1022 that can be successfully processed by the system(s) 120.

Figure 13:
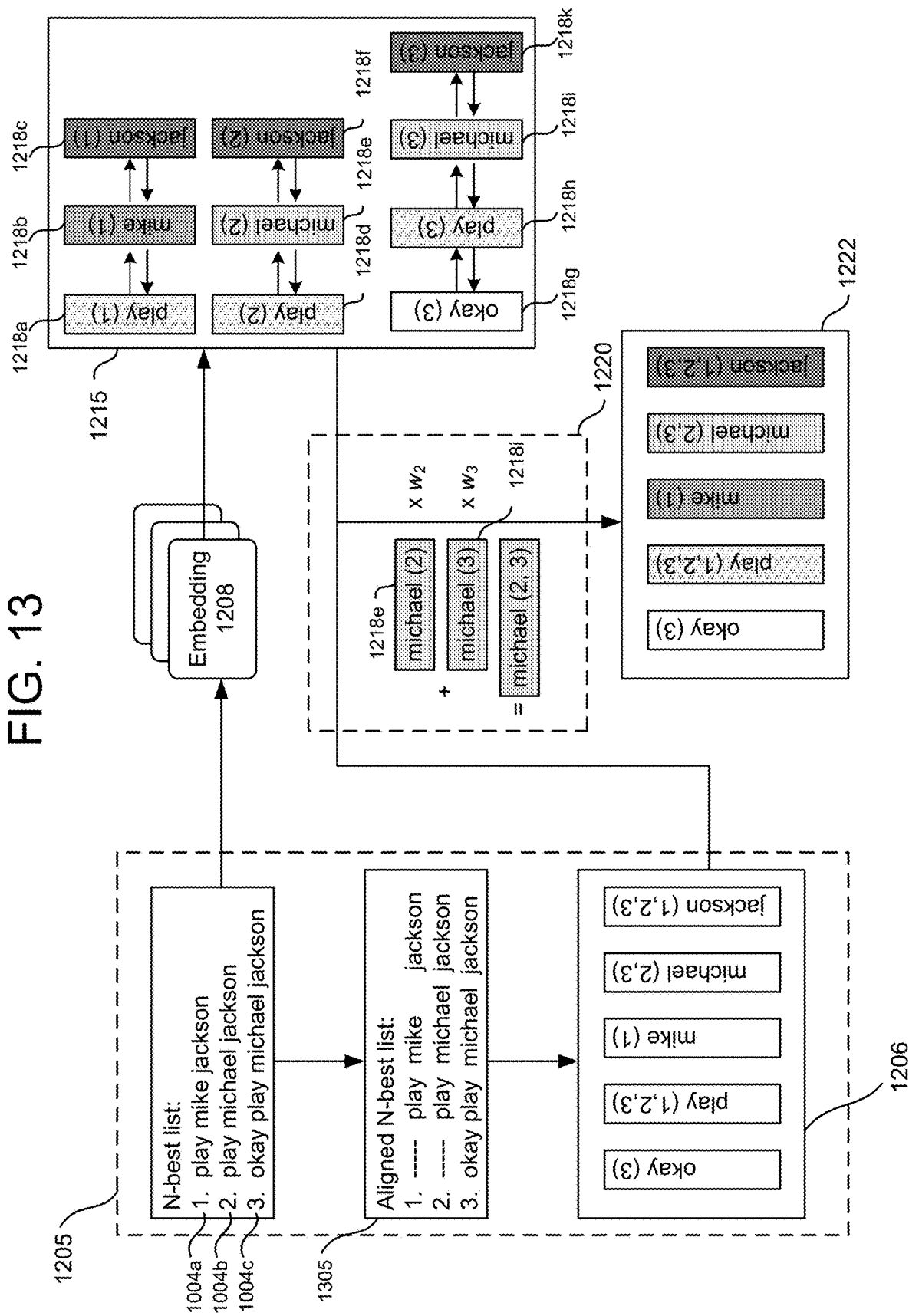
FIG. 13 illustrates an example N-best list being processed by the encoder component illustrated in FIG. 12.

FIG. 13 illustrates an example N-best list being processed by the encoder component illustrated in FIG. 12. The example N-best list 1004 illustrated in FIG. 13 includes a first hypothesis 1004*a* as "play mike jackson", a second hypothesis 104*b* as "play michael jackson", and a third hypothesis 1004*b* as "okay play michael jackson". Although the figure shows three hypotheses in the N best-list, it should be understood that they may be fewer or more than three hypotheses. As described in connection with FIG. 12, the serialize component 1205 aligns and serializes the tokens in the N-best list of hypotheses 1004. As illustrated in step 1305, the tokens in the hypotheses are aligned. Since the token "okay" only appears in the third hypothesis 1004*b*, there is a blank inserted in the first and second hypothesis for the first token. The rest of the tokens are aligned as shown in step 1305.

The serialize component 1205 links the same tokens appearing in multiple hypotheses and records the hypothesis it appears in to generate the serialized N-best list 1206. For example, as shown in FIG. 13 the unique tokens in the N-best list 1004 are "okay", "play", "mike", "michael", and "jackson". The token "play" is recorded as appearing in the first, second and third (1, 2, 3) hypotheses, while the token "michael" is recorded as appearing in the second and third (2, 3) hypotheses.

The encoder component 1005 generates a word embedding 1208 corresponding to each hypothesis in the N-best list 1004. For example, three word embeddings are generated to represent the three hypotheses illustrated in FIG. 13. The word embeddings 1208, as described in connection with FIG. 12, are processed by the trained model 1215 to determine token-level hidden states 1218 for each hypothesis. For example, as shown, hidden state 1218a associated with token "play" in the first hypothesis 1004a is generated and stored, hidden state 1218d associated with token "play" in the second hypothesis 1004b is generated and stored, and hidden state 1218g associated with token "play" in the third hypothesis 1004c is generated and stored.

The merge component 1220 merges the hidden states 1218 of the same tokens. For example, the hidden state 1218e associated with the token "michael" of the second hypothesis is merged with the hidden state 1218i associated with the token "michael" of the third hypothesis, and stored to generate hidden state vector 1222. Since the token "okay" only appears in one hypothesis, its hidden state 1218g is stored in the hidden state vector 1222. As shown, the hidden state vector 1222 represents the aggregated hidden states of the unique tokens. As described above, the merge component 1220 may determine an average of the hidden states, a weighted average of the hidden states or a sum of the hidden states. In an example embodiment, the weight average of the hidden states 1218e and 1218i may be determined by multiplying the hidden state 1218e with $w_2$ and multiplying the hidden state 1218i with $w_3$, where $w_2$ may be a score or weight corresponding to the second hypothesis 1004b and $w_3$ may be a score or weight corresponding to the third hypothesis 1004c. The hidden state vector 1222 is used by the alternate utterance 285 to generate the alternate utterance 1022.

Figure 14:
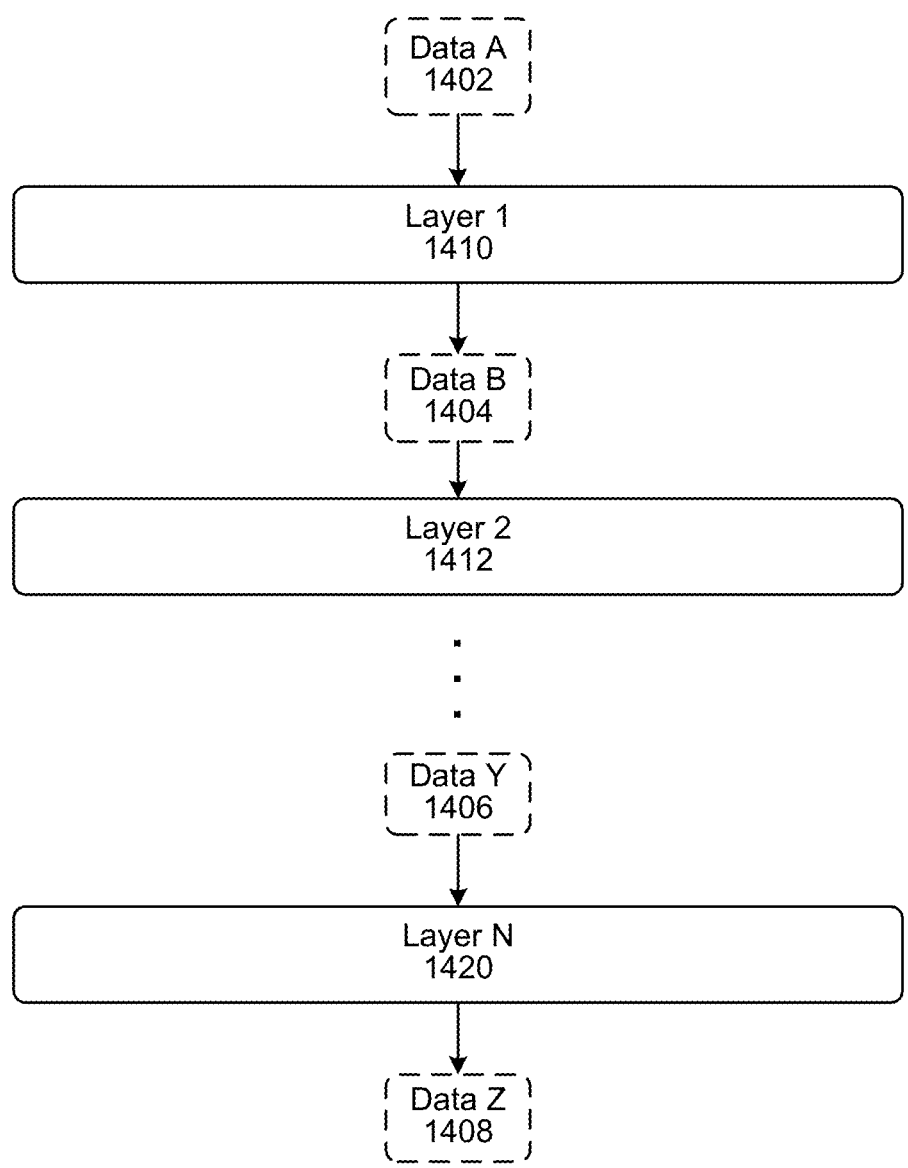
FIG. 14 is a conceptual diagram illustrating layers of a trained model according to embodiments of the present disclosure.

The trained model 1215 for the encoder 1005 may take many forms, including a neural network. As illustrated in FIG. 14, a neural network may include a number of layers, from input layer 1 1410 through output layer N 1420. Each layer is configured to output a particular type of data and output another type of data. The neural network illustrated in FIG. 14 is configured to input data of type data A 1402 (which is the input to layer 1 1410) and output data of type data Z 1408 (which is the output from the last layer N 1420). The output from one layer is then taken as the input to the next layer. For example, the output data (data B 1404) from layer 1 1410 is the input data for layer 2 1412 and so forth such that the input to layer N 1420 is data Y 1406 output from the penultimate layer (not shown).

While values for the input data/output data of a particular layer are not known until a neural network is actually operating during runtime, the data describing the neural network describes the structure and operations of the layers of the neural network.

Figure 15:
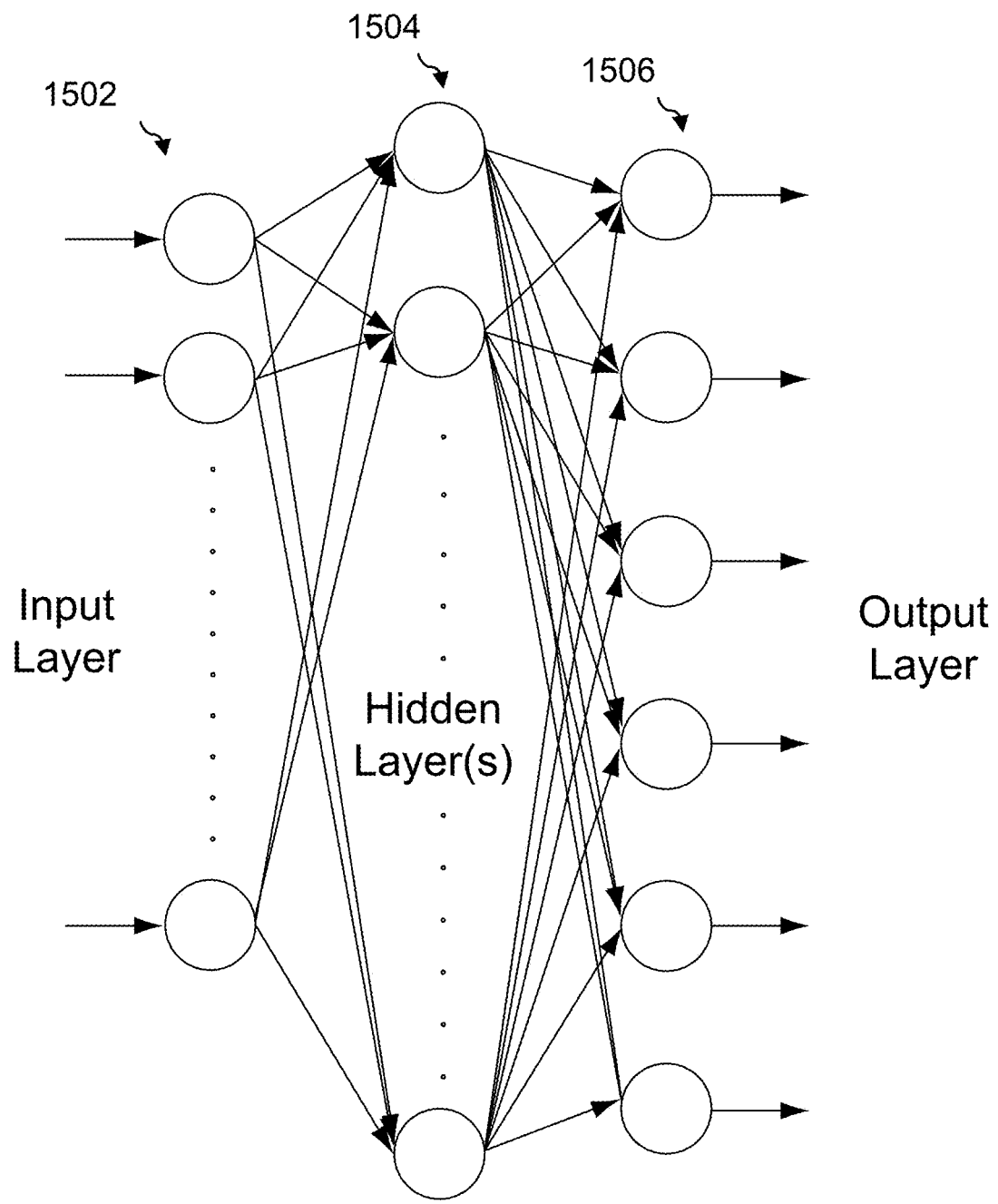
FIG. 15 illustrates a neural network for speech recognition according to embodiments of the present disclosure.

An example neural network for the trained model 1215 is illustrated in FIG. 15. A neural network may be structured with an input layer 1502, middle layer(s) 1504, and an output layer 1506. The middle layer(s) may also be known as the hidden layer(s) or hidden state of the neural network. Each node of the hidden layer is connected to each node in the input layer and each node in the output layer. Although illustrated in FIG. 15 with a single hidden layer, a neural network may include multiple middle layers. In this case each node in a hidden layer may connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs. As described below in connection with FIG. 12, the hidden layer(s) or hidden state of the neural network may be used by the encoder 1005.

Figure 16:
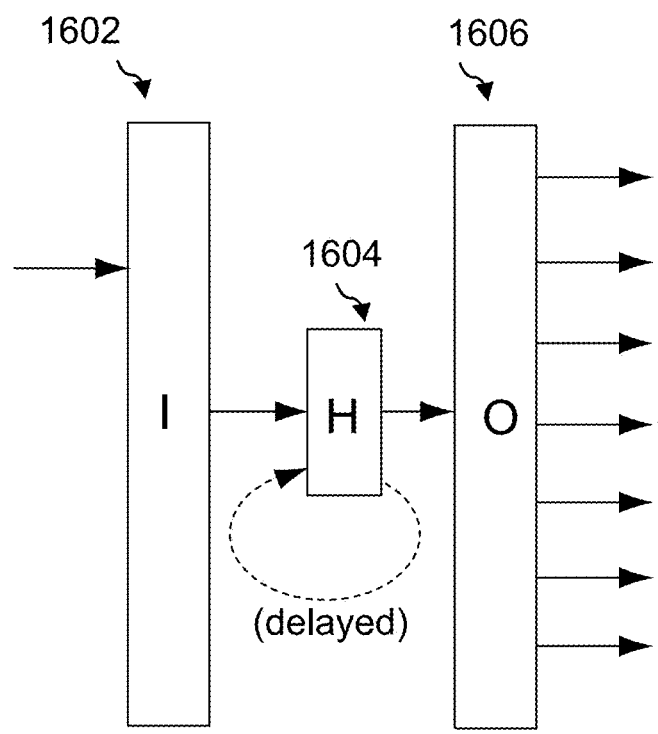
FIG. 16 illustrates a neural network for speech recognition according to embodiments of the present disclosure.

In one aspect, the neural network may be constructed with recurrent connections such that the output of the hidden layer of the network feeds back into the hidden layer again for the next set of inputs. Such a neural network is illustrated in FIG. 16. Each node of the input layer 1602 connects to each node of the hidden layer 1604. Each node of the hidden layer 1604 connects to each node of the output layer 1606. As illustrated, the output of the hidden layer 1604 is fed back into the hidden layer for processing of the next set of inputs. A neural network incorporating recurrent connections may be referred to as a recurrent neural network (RNN).

Neural networks may also be used to perform ASR processing including acoustic model processing and language model processing. In the case where an acoustic model uses a neural network, each node of the neural network input layer may represent an acoustic feature of a feature vector of acoustic features, such as those that may be output after the first pass of performing speech recognition, and each node of the output layer represents a score corresponding to a subword unit (such as a phone, triphone, etc.) and/or associated states that may correspond to the sound represented by the feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, such as the network illustrated in FIG. 6, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0.

In another embodiment, the initial connection weights are assigned randomly. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

Figure 17:
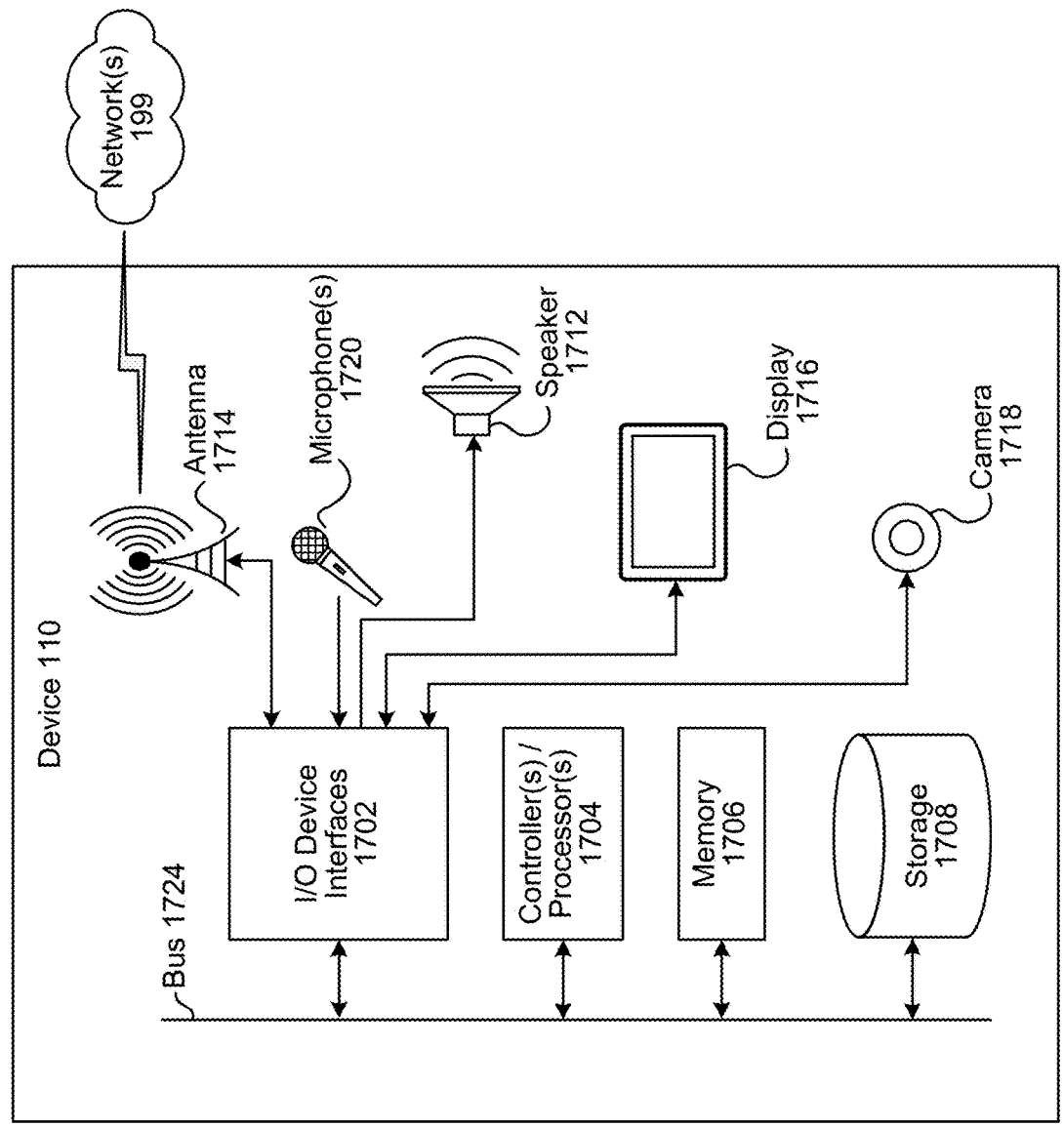
FIG. 17 is a block diagram conceptually illustrating example components of a device according to embodiments of the present disclosure.
Figure 18:
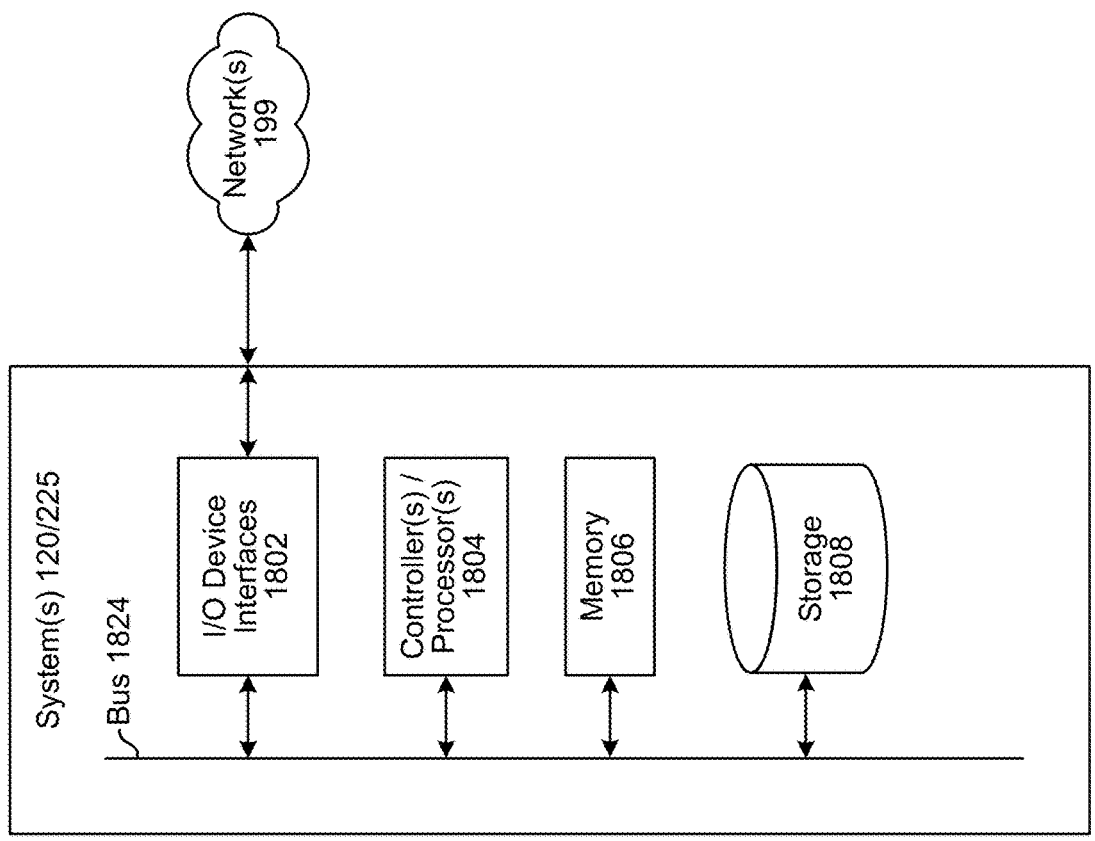
FIG. 18 is a block diagram conceptually illustrating example components of a system according to embodiments of the present disclosure.

FIG. 17 is a block diagram conceptually illustrating a device 110 that may be used with the system. FIG. 18 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (1704/1804), which may each include a central processing unit (CPU) for processing data and computer-readable instructions, and a memory (1706/1806) for storing data and instructions of the respective device. The memories (1706/1806) may individually include volatile random access memory (RAM), non-volatile read only memory (ROM), non-volatile magnetoresistive memory (MRAM), and/or other types of memory. Each device (110/120/225) may also include a data storage component (1708/1808) for storing data and controller/processor-executable instructions. Each data storage component (1708/1808) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1702/1802).

Computer instructions for operating each device (110/120/225) and its various components may be executed by the respective device's controller(s)/processor(s) (1704/1804), using the memory (1706/1806) as temporary "working" storage at runtime. A device's computer instructions may be stored in a non-transitory manner in non-volatile memory (1706/1806), storage (1708/1808), or an external device(s). Alternatively, some or all of the executable instructions may be embedded in hardware or firmware on the respective device in addition to or instead of software.

Each device (110/120/225) includes input/output device interfaces (1702/1802). A variety of components may be connected through the input/output device interfaces (1702/1802), as will be discussed further below. Additionally, each device (110/120/225) may include an address/data bus (1724/1824) for conveying data among components of the respective device. Each component within a device (110/120/225) may also be directly connected to other components in addition to (or instead of) being connected to other components across the bus (1724/1824).

Referring to FIG. 17, the device 110 may include input/output device interfaces 1702 that connect to a variety of components such as an audio output component such as a speaker 1712, a wired headset or a wireless headset (not illustrated), or other component capable of outputting audio. The device 110 may also include an audio capture component. The audio capture component may be, for example, a microphone 1720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1716 for displaying content. The device 110 may further include a camera 1718.

Via antenna(s) 1714, the input/output device interfaces 1702 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1702/1802) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O interfaces (1702/1802), processor(s) (1704/1804), memory (1706/1806), and/or storage (1708/1808) of the device(s) 110 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 19:
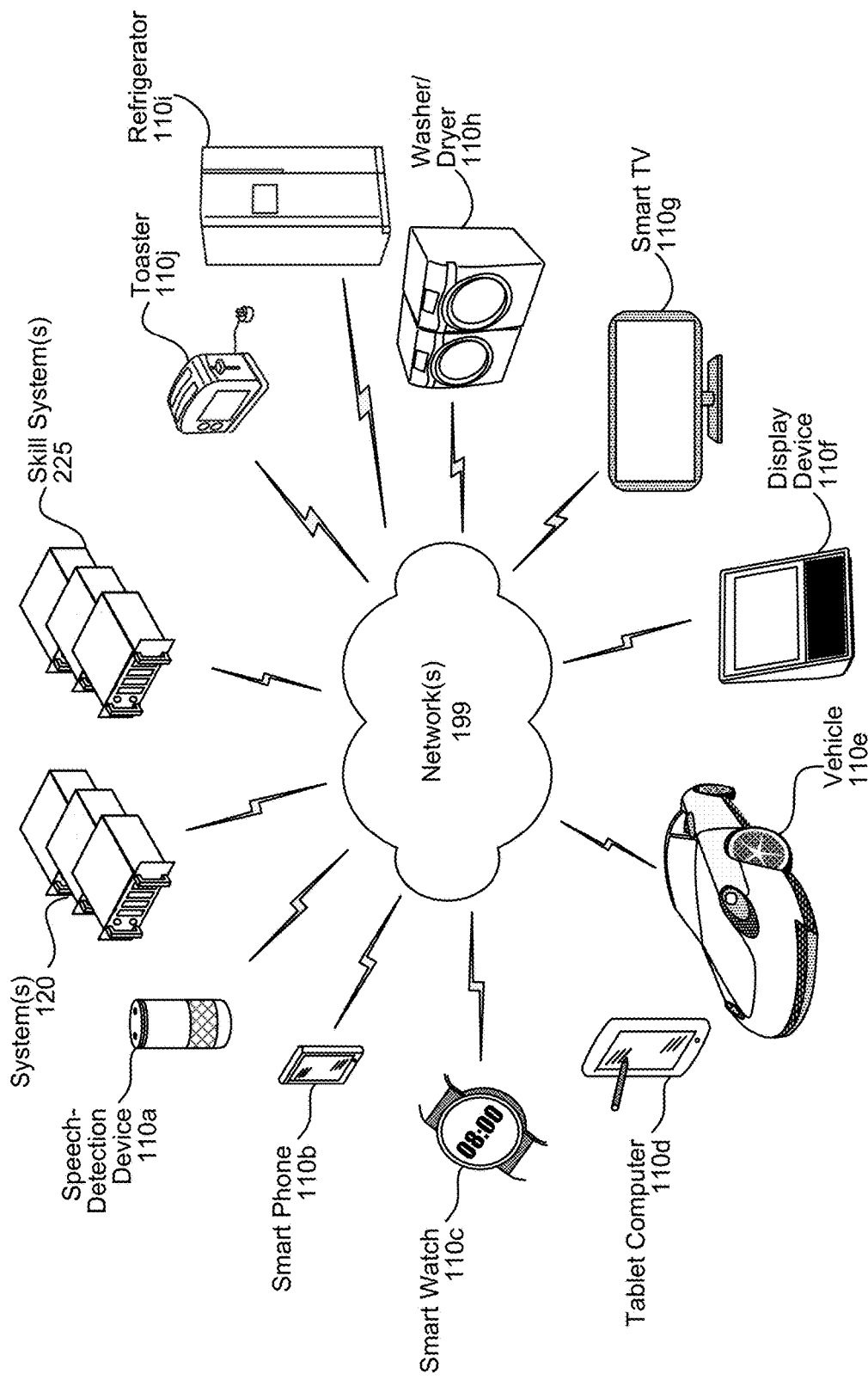
FIG. 19 illustrates an example of a computer network for use with the speech processing system.

As illustrated in FIG. 19, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving input audio data corresponding to an utterance;
   performing automatic speech recognition (ASR) processing on the input audio data to generate ASR hypothesis data comprising:
      a first ASR hypothesis including at least a first token, and
      a second ASR hypothesis including at least a second token and a third token;
   generating a first word embedding vector representing the first ASR hypothesis;
   generating a second word embedding vector representing the second ASR hypothesis;
   processing the first word embedding vector using a trained model to determine first hidden state data corresponding to the first token, the trained model being a neural network machine learning model;
   processing the second word embedding vector using the trained model to determine second hidden state data corresponding to the second token and third hidden state data corresponding to the third token;
   determining that the first token and the second token match;
   in response to determining that the first token and second token match, determining merged hidden state data by averaging the first hidden state data and the second hidden state data;
   determining a data vector corresponding to tokens in the first ASR hypothesis and the second ASR hypothesis, wherein the data vector includes at least the merged hidden state data and the third hidden state data; and
   determining alternate utterance text data using at least the data vector.

2. The computer-implemented method of claim 1, further comprising:
   determining a first confidence score associated with the first ASR hypothesis;
   determining a second confidence score associated with the second ASR hypothesis;

determining that the first confidence score is below a threshold;
determining that the second confidence score is below the threshold; and
determining a potential ASR error in response to the first confidence score and the second confidence score being below the threshold,
wherein determining the first word embedding is performed in response to determining the potential ASR error.

3. The computer-implemented method of claim 1, wherein determining the alternate utterance text data comprises:
receiving a first set of words;
determining a first output token from the first set of words or the tokens represented in the data vector;
determining first data representing features of the first output token;
determining second data corresponding to a portion of the data vector processed to determine the first output token;
determining probability data using the first data and the second data, the probability data indicating a probability that a next output token is selected from the first set of words;
determining, based on the probability data, a second output token from the tokens represented in the data vector; and
determining the alternate utterance text data as including at least the first output token and the second output token.

4. The computer-implemented method of claim 1, wherein performing the ASR processing further generates a third ASR hypothesis having at least a fourth token and a fifth token, and the method further comprises:
generating a third word embedding representing the third ASR hypothesis;
processing the third word embedding using the trained model to determine at least fourth hidden state data corresponding to the fourth token and fifth hidden state data corresponding to the fifth token;
determining that the fourth token, the first token and the second token match;
determining the merged hidden state data by averaging the first hidden state data, the second hidden state data and the fourth hidden state data based on the first, second and fourth tokens matching; and
determining the data vector using the merged hidden state, the third hidden state data and the fifth hidden state data.

5. A computer-implemented method comprising:
receiving audio data corresponding to an utterance;
performing automatic speech recognition processing using the audio data to determine:
first output data including at least a first word, and second output data including at least a second word;
determining a first feature vector representing the first output data;
determining a second feature vector representing the second output data;
processing the first feature vector using a trained model to determine first model data associated with the first word;
processing the second feature vector using the trained model to determine second model data associated with the second word;
determining that the first word is the second word;
determining merged model data using the first model data and the second model data in response to the first word being the second word; and
determining alternate utterance text data using at least the merged model data.

6. The computer-implemented method of claim 5, further comprising:
determining a token list, the token list including a plurality of words, including the first word and the second word;
storing first origin data corresponding to the first word, the first origin data indicating the first word being included in the first output data and the second output data; and
storing second origin data corresponding to a third word, the second origin data indicating the third word being included in the second output data,
wherein determining the merged model data comprises using the token list, the first origin data, and the second origin data.

7. The computer-implemented method of claim 5, further comprising:
receiving input audio data corresponding to an utterance;
performing automatic speech recognition (ASR) processing on the input audio data to determine at least the first output data having a first confidence score and the second output data having a second confidence score; and
determining a potential ASR error in response to the first confidence score and the second confidence score being below a threshold,
wherein determining the first feature vector and the second feature vector is performed in response to determining the potential ASR error.

8. The computer-implemented method of claim 5, further comprising:
receiving a third output data having at least a third word and a fourth word;
determining a third feature vector representing the third output data;
processing the third feature vector using a trained model to determine third model data associated with the third word and fourth model data associated with the fourth word;
determining that the third word, the first word and the second word match;
determining the merged model data using the first model data, the second model data and the third model data; and
determining a data vector using the merged model data and the fourth model data, the data vector representing words in the first, second and third output data,
wherein determining the alternate utterance text data comprises using the data vector.

9. The computer-implemented method of claim 8, wherein determining the alternate utterance text data using at least the data vector comprises:
receiving a first set of words;
determining to select a first output word from the first set of words or the words represented in the data vector;
determining first data representing the first output word and at least a portion of the data vector;
determining probability data using the first data, the probability data indicating a probability of a next output word being selected from the first set of words;
determining to select, based on the probability data, a second output word from the words represented in the data vector; and determining the alternate utterance text data as including at least the first output word and the second output word.

10. The computer-implemented method of claim 5, wherein determining the merged model data comprises averaging the first model data and the second model data.

11. The computer-implemented method of claim 5, wherein processing the first feature vector using the trained model comprises processing the first feature vector using a bi-directional LSTM.

12. The computer-implemented method of claim 5, further comprising at a time period prior to receiving the first output data and the second output data:
   determining first data including a plurality of utterance-pairs, each of the utterance-pairs including a first defective utterance and a second successful utterance, the second successful utterance corresponding to the first defective utterance;
   determining second data representing a list of ASR hypotheses corresponding to the first defective utterance in each of the utterance-pairs;
   storing training data in a data structure, the training data including the first data and the second data; and
   processing the training data using a machine learning model to determine the trained model.

13. A system, comprising:
   at least one processor; and
   at least one memory comprising instructions that, when executed by the at least one processor, cause the system to:
      receive audio data corresponding to an utterance;
      perform automatic speech recognition processing using the audio data to determine:
         first output data including at least a first word, and
         second output data including at least a second word;
      determine a first feature vector representing the first output data;
      determine a second feature vector representing the second output data;
      process the first feature vector using a trained model to determine first model data associated with the first word;
      process the second feature vector using the trained model to determine second model data associated with the second word;
      determine that the first word is the second word;
      determine merged model data using the first model data and the second model data in response to the first word being the second word; and
      determine alternate utterance text data using at least the merged model data.

14. The system of claim 13, wherein the instructions, when executed by the at least one processor, further cause the system to:
   determine a token list, the token list including a plurality of words, including the first word and the second word;
   store first origin data corresponding to the first word, the first origin data indicating the first word being included in the first output data and the second output data;
   store second origin data corresponding to a third word, the second origin data indicating the third word being included in the second output data; and
   determine the merged model data using the token list, the first origin data, and the second origin data.

15. The system of claim 13, wherein the instructions, when executed by the at least one processor, further cause the system to:
   receive input audio data corresponding to an utterance;
   perform automatic speech recognition (ASR) processing on the input audio data to determine at least the first output data having a first confidence score and the second output data having a second confidence score;
   determine a potential ASR error in response to the first confidence score and the second confidence score being below a threshold; and
   determine the first feature vector and the second feature vector in response to determining the potential ASR error.

16. The system of claim 13, wherein the instructions, when executed by the at least one processor, further cause the system to:
   receive a third output data having at least a third word and a fourth word;
   determine a third feature vector representing the third output data;
   process the third feature vector using a trained model to determine third model data associated with the third word and fourth model data associated with the fourth word;
   determine that the third word, the first word and the second word match;
   determine the merged model data using the first model data, the second model data and the third model data;
   determine a data vector using the merged model data and the fourth model data, the data vector representing words in the first, second and third output data; and
   determine the alternate utterance text data using the data vector.

17. The system of claim 16, wherein the instructions, when executed by the at least one processor, that cause the system to determine the alternate utterance text data further comprise:
   receive a first set of words;
   determine to select a first output word from the first set of words or the words represented in the data vector;
   determine first data representing the first output word and at least a portion of the data vector;
   determine probability data using the first data, the probability data indicating a probability of a next output word being selected from the first set of words;
   determine to select, based on the probability data, a second output word from the words represented in the data vector; and
   determine the alternate utterance text data as including at least the first output word and the second output word.

18. The system of claim 13, wherein the instructions, when executed by the at least one processor, that cause the system to determine the merged model data comprises determining an average of the first model data and the second model data.

19. The system of claim 13, wherein the trained model is a bi-directional LSTM.

20. The system of claim 13, wherein the instructions, when executed by the at least one processor, further cause the system to at a time period prior to receiving the first output data and the second output data:
   determine first data including a plurality of utterance-pairs, each of the utterance-pairs including a first defective utterance and a second successful utterance, the second successful utterance corresponding to the first defective utterance;
   determine second data representing a list of ASR hypotheses corresponding to the first defective utterance in each of the utterance-pairs;

store training data in a data structure, the training data including the first data and the second data; and
process the training data using a machine learning model to determine the trained model.

\* \* \* \* \*